(12) United States Patent
Rohl

(10) Patent No.: US 7,677,585 B2
(45) Date of Patent: Mar. 16, 2010

(54) AUXILIARY PUSHCHAIR SEAT

(76) Inventor: Stephanie Rohl, Longwall Cottage, Sotwell Street, Brightwell-Cum-Sotwell, Oxon, OX10 0RQ (GB)

( * ) Notice: Subject to any disclaimer, the term of this patent is extended or adjusted under 35 U.S.C. 154(b) by 449 days.

(21) Appl. No.: 11/578,594

(22) PCT Filed: Apr. 1, 2005

(86) PCT No.: PCT/GB2005/001276

§ 371 (c)(1),
(2), (4) Date: Oct. 16, 2006

(87) PCT Pub. No.: WO2005/105546

PCT Pub. Date: Nov. 10, 2005

(65) Prior Publication Data

US 2007/0252352 A1    Nov. 1, 2007

(30) Foreign Application Priority Data

Apr. 30, 2004   (GB) ................................ 0409729.1
May 21, 2004   (WO) ............... PCT/GB2004/002170

(51) Int. Cl.
*B62K 27/00*   (2006.01)
(52) U.S. Cl. .......................... 280/203; 280/39; 280/642
(58) Field of Classification Search .............. 280/47.38, 280/47.35, 30, 204, 209, 647, 642, 650, 658, 280/656, 288.4, 203, 39
See application file for complete search history.

(56) References Cited

U.S. PATENT DOCUMENTS

| 3,000,645 | A | * | 9/1961 | Schmidt ....................... 280/39 |
| 4,969,656 | A | * | 11/1990 | Clausen ................... 280/47.38 |
| 5,125,712 | A | * | 6/1992 | Stamoutsos ................. 296/77.1 |
| 5,522,121 | A | * | 6/1996 | Fraynd et al. ............ 280/47.38 |
| 5,918,892 | A | * | 7/1999 | Aaron et al. .............. 280/47.38 |
| 6,527,294 | B1 | * | 3/2003 | Brewington et al. ........ 280/647 |
| 6,561,526 | B1 | * | 5/2003 | Towns ....................... 280/47.38 |
| 6,715,783 | B1 | * | 4/2004 | Hanson et al. ............. 280/642 |
| 6,752,405 | B1 | * | 6/2004 | Wright .................... 280/47.38 |
| 6,851,693 | B2 | * | 2/2005 | Haeggberg .................. 280/650 |
| 6,938,906 | B1 | * | 9/2005 | Black ....................... 280/47.38 |

* cited by examiner

*Primary Examiner*—Hau V Phan
(74) *Attorney, Agent, or Firm*—Carter, DeLuca, Farrell & Schmidt, LLP

(57) ABSTRACT

An auxiliary seat (1) attachable to a pushchair (2) to enable it to accommodate two children seated side-by-side. The seat comprises a frame (10) having a backrest (22) and a base (21) and a wheel (30) in contact with the ground in an operative position. A child seated on the base is supported with their back against the backrest (22). The frame (10) is configured so that the backrest (22) and the base (21) fold substantially flat when the auxiliary seat is not in use. The auxiliary seat (1), including the base (21) and backrest (22), can pivot relative to the pushchair (2) to be folded against the side thereof in a storage position with the wheel (30) off the ground, once the base (21) and the backrest (22) of the seat have been folded substantially flat.

41 Claims, 31 Drawing Sheets

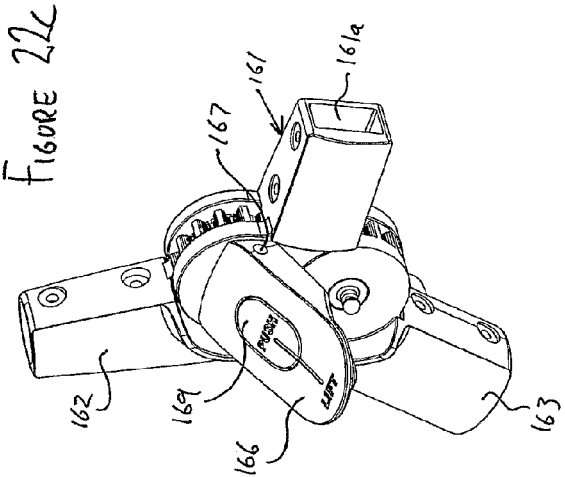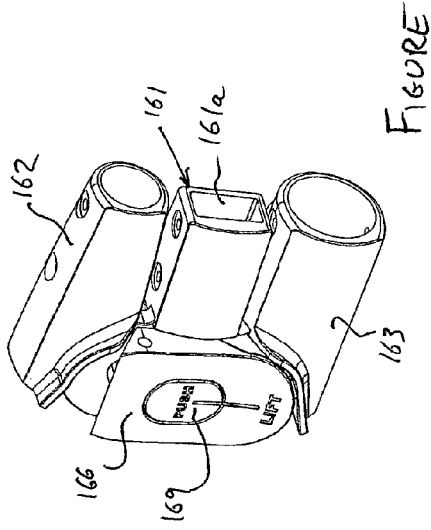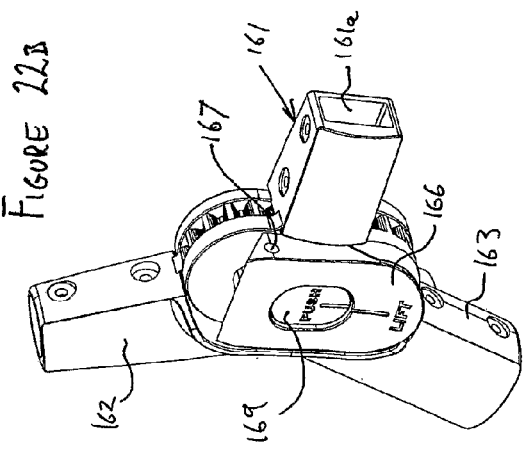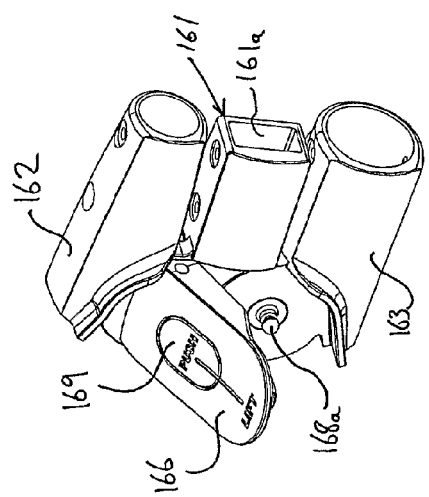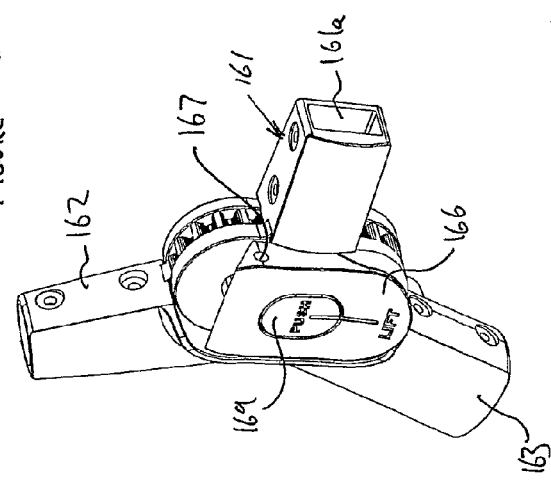

AUXILIARY PUSHCHAIR SEAT

CROSS-REFERENCE TO RELATED APPLICATIONS

The present application claims the benefit of and priority to International Application No. PCT/GB2005/001276 filed on Apr. 1, 2005 claiming priority from each of British Patent Application No. 0409729.1 filed on Apr. 30, 2004 and International Application No. PCT/GB2004/002170 filed on May 21, 2004, the entire contents of each of which are incorporated herein by reference.

The present invention relates to a pushchair, and more specifically, to an add-on seating device for pushchairs.

It is often the case with parents having more than one child that the age gap between the children is such that the older child is not fully able to walk by the time the second child is born or is reluctant to do so for an extended period of time. During the first child's initial years, the parents will most probably have bought a single-seat pushchair to transport the child around in until it learns to walk properly. Modern pushchairs can be an expensive outlay, and perhaps difficult to afford, especially for young couples or those on low income. Therefore, when the second child is born, the parents find themselves requiring another pushchair so that both children can be transported together. Therefore, they must either buy another single-seat pushchair in addition to the first, which means having to use two pushchairs each time both children are taken out together or, buy a new double-seat pushchair, which means the original single-seat pushchair is then redundant. In either case, it involves another significant financial outlay for the parents.

One solution to this problem is to provide an add-on device that can be attached to the existing single-seat pushchair to adapt it to be able to carry both children simultaneously. Recently, pushchair add-on products have become commercially available and one such device comprises a wheeled platform that attaches to the rear of the pushchair, on which the elder child can stand whilst the younger child is seated.

However, this platform type of device has a number of disadvantages. Firstly, as the device is a platform and not a seat, it requires the elder child to remain standing, which can quickly tire them out and become uncomfortable for them. This has a safety implication as well, since the elder child is not provided with a harness to stop them falling off the device. Secondly, the device is positioned at the rear of the pushchair between the pushchair and the parent. This means that the parent has to lean forward and stoop over and/or around the standing child in order to push the pushchair, and this can quickly cause backache and stiffness, and is generally uncomfortable over anything but the shortest distances. Thirdly, the wheels of the platform are positioned behind the rear wheels of the pram, which means that it can be difficult to push the pushchair up or down kerbs, as the device hinders the ability of the pushchair to be pivoted about the rear wheel axle. This device can also unbalance the pushchair and cause it to tip over very easily It is therefore an object of the present invention to provide an add-on pushchair seating device that substantially alleviates or overcomes the problems mentioned above.

SUMMARY

Accordingly, the present invention provides an auxiliary seat attachable to a pushchair to enable it to accommodate two children seated side-by-side, the seat comprising a frame having a backrest and a base and a wheel in contact with the ground in an operative position to support a child seated on the base with their back against the backrest, wherein the frame is configured so that the backrest and the base fold substantially flat when the auxiliary seat is not in use and wherein the auxiliary seat, including the base and backrest, can pivot relative to the pushchair to be folded against the side thereof in a storage position with the wheel off the ground, once the base and backrest of the seat have been folded substantially flat.

In a preferred embodiment, the base and the backrest are pivotable relative to one another such that they are collapsible from the erect operative position to the collapsed folded position by means of a scissor-like mechanism, and the scissor-like mechanism preferably includes at least one sliding joint to enable the base and backrest to be erected and collapsed.

Conveniently, the backrest is attached to one end of a first support strut and the base is attached to one end of a second support strut, and in which said first and second support struts are pivotable relative to each other and the end of the first support strut remote from the backrest is connected to the at least one sliding joint.

A locking mechanism is preferably provided to retain the seat in the erect operative position, and preferably, a locking mechanism locks the at least one sliding joint in place and may comprise a latch extending from the at least one sliding joint, operable to lock onto a fixed shaft on the frame. The latch is preferably located at one end of an arm, the arm rotatably mounted to the at least one sliding joint and operable to move from a first locked position in which the latch snags on the fixed shaft, to a second unlocked position in which the latch is clear of the fixed shaft to allow movement of the at least one sliding joint.

In an alternative embodiment of the invention, the backrest and the base are pivotably connected to one another by hinge joints to be pivotable from the erect operative position to the collapsed storage position in which the backrest lies flat against the base.

The base conveniently comprises a base frame and a seat covering attached thereto, and the backrest preferably comprises a backrest frame with a backrest coveting attached thereto.

In a preferred embodiment, the wheel is secured to the frame by a pivotable wheel mechanism which can pivot from an extended operative position to a folded storage position in which the wheel mechanism lies substantially flat against the frame.

The wheel mechanism preferably includes a telescopic strut to allow the distance of the wheel from the frame to be telescopically adjusted independently of the pivoting of the wheel mechanism from the operative position to the storage position, and the telescopic strut conveniently includes a locking mechanism to lock the strut in the desired position.

In a preferred embodiment, in the storage position, the wheel mechanism lies flat against the base on the opposite side thereto to the backrest.

The wheel mechanism is preferably connected to the frame at said hinge joints, and the backrest and the wheel mechanism are advantageously mechanically connected to one another to be moveable from their respective operative positions to their folded storage position together.

At least one hinge joint preferably includes a locking means to lock the backrest, and preferably also the associated wheel mechanism, in the operative position or in the storage position. The locking means preferably includes a pair of ratchet plates operated by a cam lever to move from a locked position in which the ratchets of each plate engage with each other, to an unlocked position in which the ratchets of each plate are out of engagement with each other to allow the backrest and/or wheel mechanism to pivot about the hinge joints.

The frame may be attached to the pushchair by a first clamping means extending from one side of the frame, and the first clamping means may be attached to a first support strut which is hingedly attached to the frame. The frame is preferably further attached to the pushchair by a second clamping means extending from said one side of the frame and the second clamping means is conveniently hingedly attached to the frame. The first and second clamping means are preferably attachable to a supplementary pushchair frame bar which includes further attachment means operable to fix the bar and seat attached thereto, to the conventional pushchair. Alternatively, the first and second clamping means may be attachable to a replacement pushchair frame bar which can be fitted in place of an existing section of frame of a conventional pushchair to fix the seat thereto.

The auxiliary seat may include at least one clamp to secure the add-on seat to a frame of a pushchair, and the at least one clamp is preferably attached to a connection bar, and the frame is attached to the connection bar by at least one hinge connector to be pivotable relative to the connection bar. The at least one clamp and/or the at least one hinge connector are preferably slidable relative to the connection bat allow the position of the frame to be adjusted relative to the pushchair. The frame and connection bar are advantageously releasably attached to the connection bar. At least one hinge connector preferably includes a locking mechanism to lock the auxiliary seat in the operative position.

The auxiliary seat of the invention is preferably releasably attachable to said pushchair. A preferred embodiment of the invention includes a locking mechanism to secure the auxiliary seat in the storage position.

In a preferred embodiment, the at least one wheel is detachable, and the at least one wheel is preferably positioned such that when the auxiliary seat is mounted on the pushchair in an operative position, the at least one wheel is in alignment with a rear wheel of the pushchair, and more preferably, coaxial with an axle of a rear wheel of the pushchair.

The seat conveniently includes a safety harness to retain a child in position thereon, and may also include a rain cover attached to the seat to at least partially surround a child sitting on the seat. A sunshade may also be attached to the seat to shade a child sitting on the seat, and a toy steering wheel or a toy hobby-horse style attachment may be positionable in front of a child sitting on the seat.

DETAILED DESCRIPTION OF THE DRAWINGS

Preferred embodiments of the present invention will now be described, by way of examples only, with reference to the accompanying drawings, in which:

FIGS. 22A-22E are various perspective views of the right hinge bracket showing the locking mechanism;

DETAILED DESCRIPTION OF EMBODIMENTS

Figure 1:
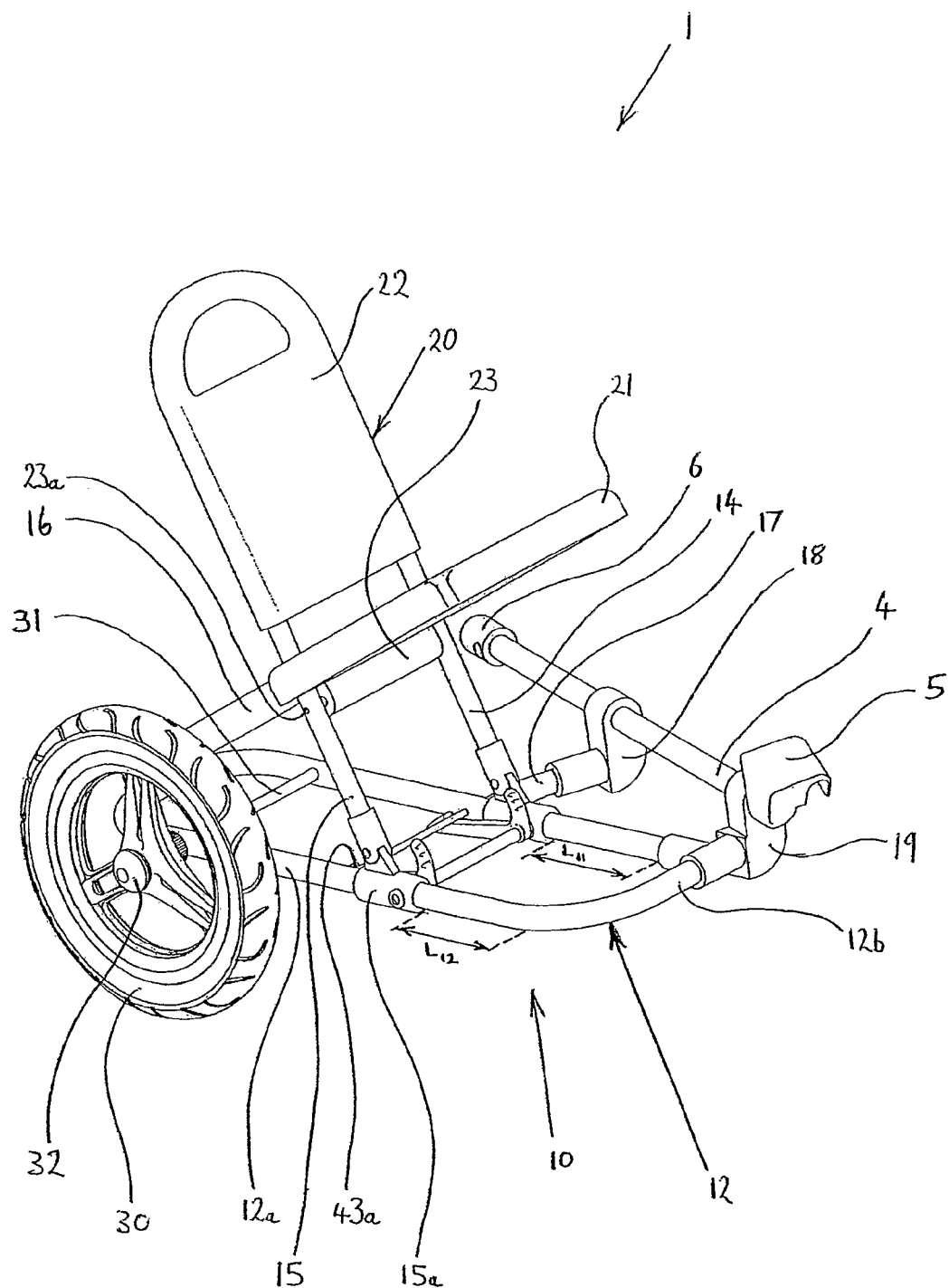
FIG. 1 shows a perspective view of a pushchair add-on device according to a first embodiment of the invention, in an erected operative position.

Referring now to FIGS. 1-7 of the drawings, a pushchair add-on device 1, for attachment to any type of conventional pushchair 2 (see FIGS. 6 and 7), is shown, comprising a chassis frame 10, a seat portion 20 and a wheel 30. The chassis 10 comprises first and second generally curved L-shaped tubular chassis members 11, 12 arranged so that long sides 11a, 12a of each member 11, 12 are parallel to one another, and short sides 11b, 12b are parallel to one another. Each end of each chassis member 11, 12 is connected to a correspondingly opposite end of the other member so as to form a generally rectangular chassis frame 10.

The seat portion 20 comprises a base 21 and a backrest 22. It can also include a seat harness (not shown) comprising a strap extending from either side of the backrest 22 and one extending from the middle of the base 21 at the front thereof, in which all three straps meet in a 'T'-shaped clasp.

The chassis frame 10 includes two collars, 14a, 15a, one slideably received on each of the long sides 11a, 12a of the L-shaped chassis members 11, 12. Each collar 14a, 15a includes a pivot joint integrally formed therewith, and a backrest support stanchion 14, 15 is pivotably attached to each of the collar pivot joints 14a, 15a respectively, and extends therefrom. The backrest 22 is attached at either side to the backrest support stanchions 14, 15 and the backrest 22 is thereby pivotable about the collar pivot joints 14a, 15a.

The chassis 10 also includes a seat support stanchion 16 pivotably attached at one end by a pivot joint 16a to the short side 11b of the first L-shaped chassis member 11 at the rear of the chassis frame 10. The base 21 is rigidly secured to the other end of the seat support stanchion 16 and a lug 23 extends from the rear of the base 21. A hinge rod 23a extends through the lug 23 and each end of the hinge rod 23a extends through the backrest support stanchions 14, 15 respectively. The base 21 is thereby pivotable relative to the backrest support stanchions 14, 15 about said hinge rod 23a and lug 23.

Figure 2:
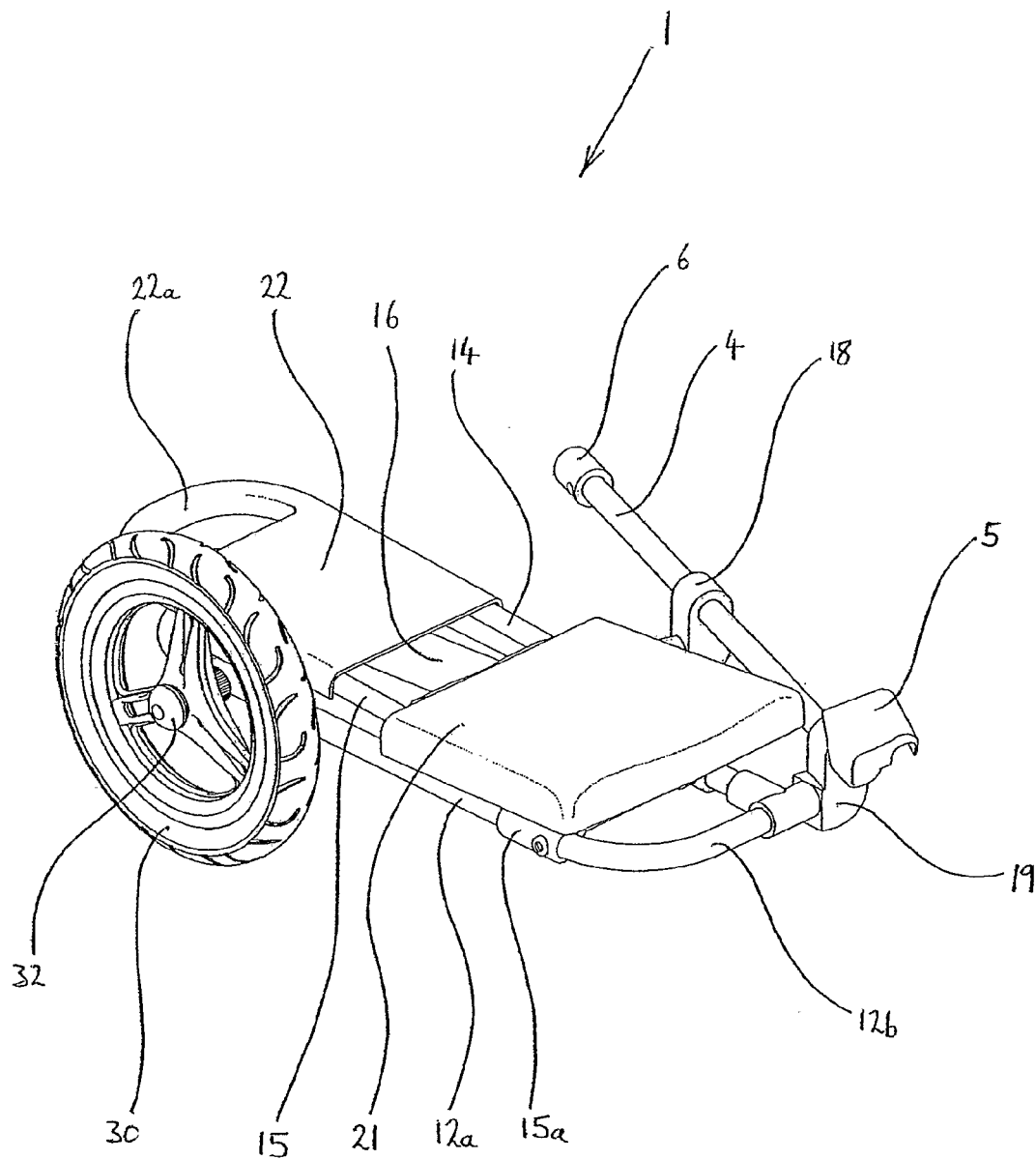
FIG. 2 shows the pushchair add-on device of FIG. 1 in a collapsed position.
Figure 3:
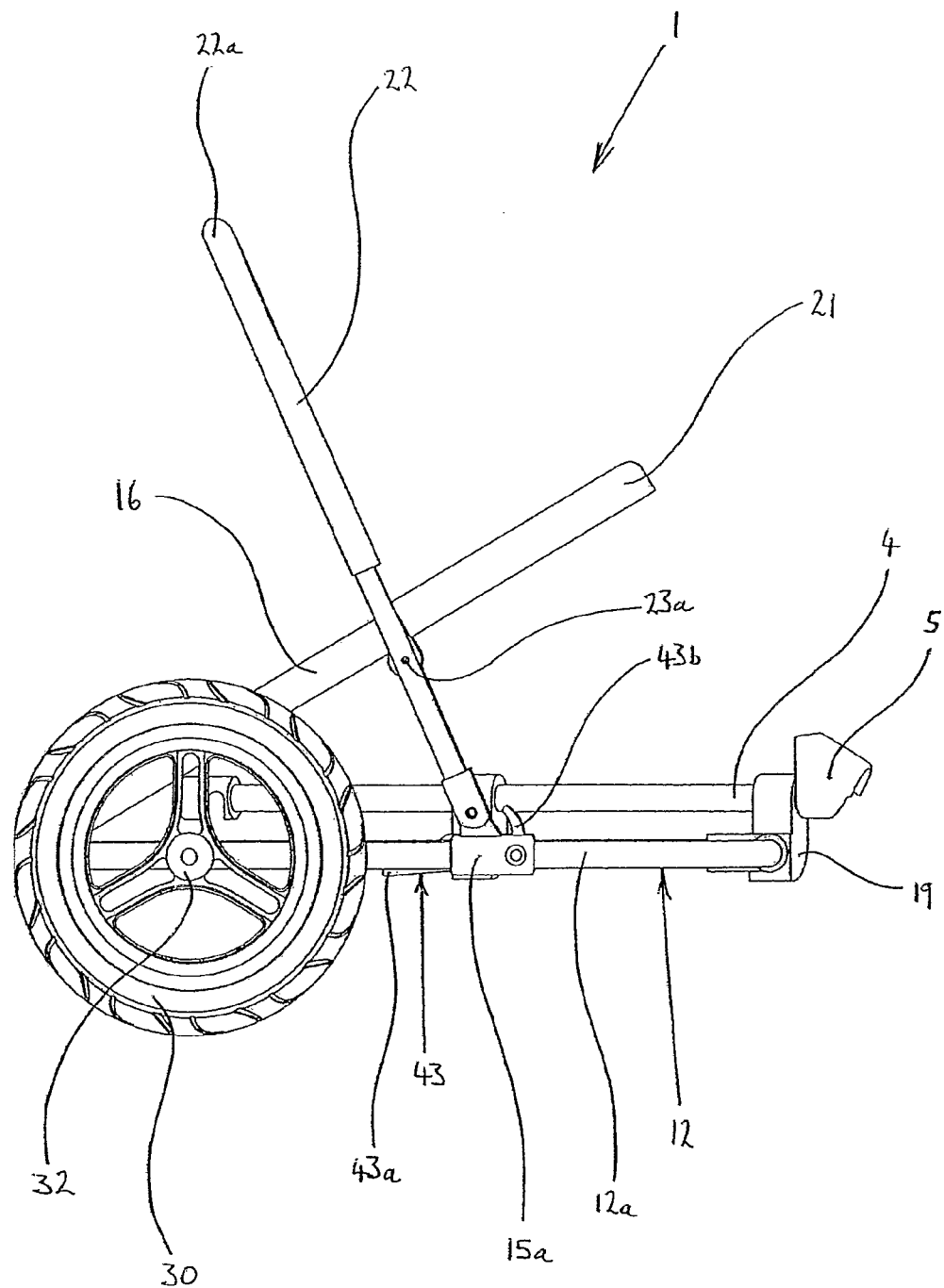
FIG. 3 shows a side view of the pushchair add-on device of FIG. 1.
Figure 4:
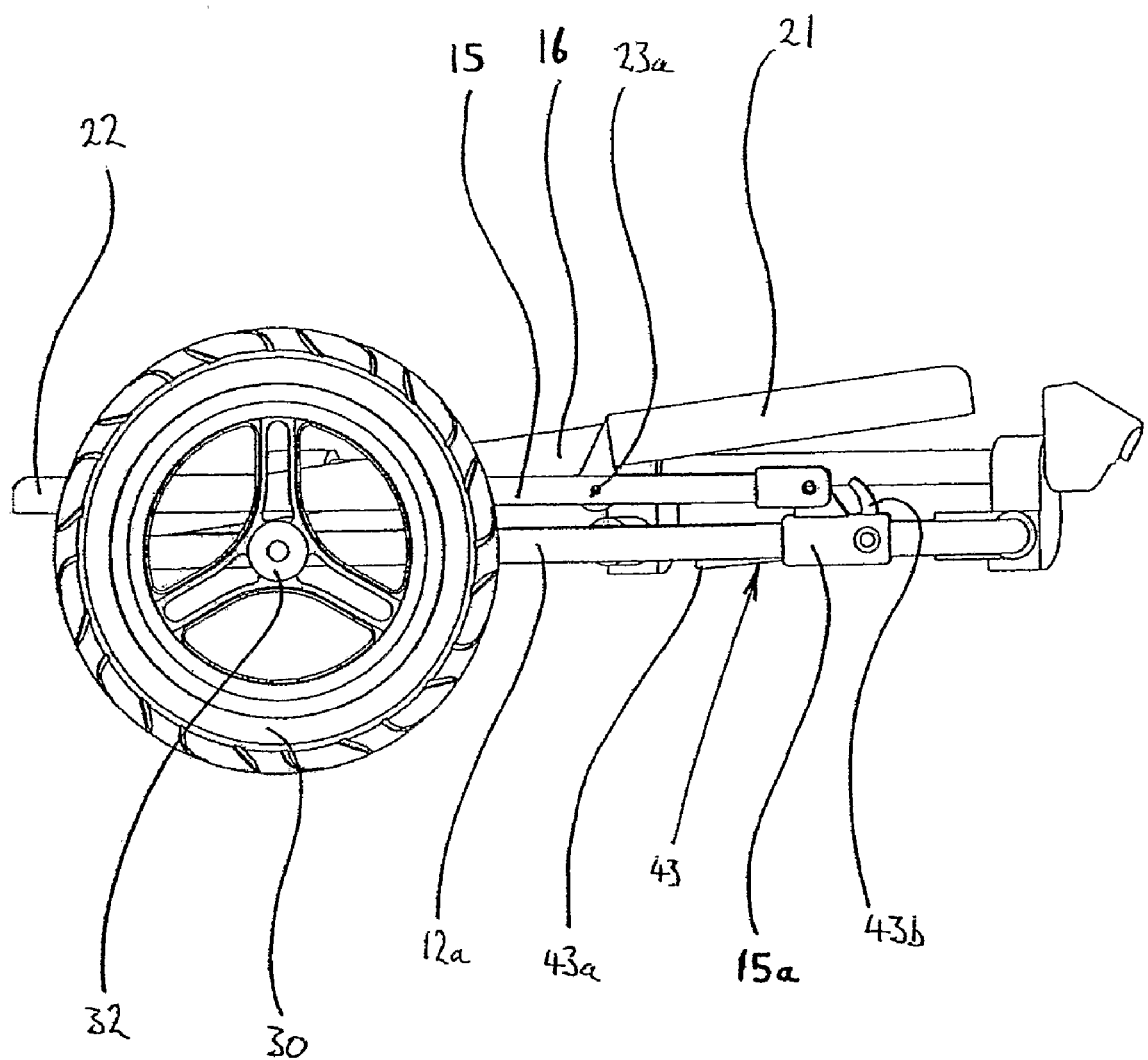
FIG. 4 shows a side view of the pushchair add-on device of FIG. 2.

The mechanism described above allows the seat portion 20 to be moveable from a collapsed position shown in FIGS. 2 and 4 in which the base 21 and backrest 22 lie substantially flat against the chassis frame 10, to an operative position as shown in FIGS. 1, 3, 5 and 6 in which the seat portion 20 is erected and the plane of the base 21 is substantially at right angles to the plane of the backrest 22. The arrangement of the components is such that the backrest support stanchions 14, 15 and the seat support stanchion 16, are moveable relative to one another in a scissor-like action, wherein the central pivot point of the scissor action is the hinge rod 23a and the lug 23 on the base 21. The end of the seat support stanchion 16 remote from the base 21 is only pivotable relative to the chassis member 11, and is not moveable laterally relative to it. Therefore, to enable the scissor-action mentioned above, the collar pivot joints 14a, 15a, to which the backrest support stanchions 14, are attached, slide along a section $L_{11}$, $L_{12}$ of the chassis members 11, 12 respectively as the seat portion 20 is moved from the erect position to the collapsed position.

The chassis 10 further includes a horizontal axle shaft 31 that extends from the long side 11a of the first chassis member 11 through the long side 12a of the second chassis member 12 and protrudes a short distance out of the other side of the second chassis member 12. A section of the protruding end of the axle shaft 31 is threaded in order to receive a retaining nut 32. The wheel 30 includes a central aperture through which the protruding end of the axle shaft 31 can be received. The retaining nut 32 can then be screwed onto the threaded end of the axle shaft 31 to retain the wheel 30 in place whilst allowing it to be freely rotatable about the axle shaft 31. The wheel 30 is therefore easily removable from the axle shaft 31 by removal of the retaining nut 32. It will be appreciated that other such retaining means may be used instead of a screw thread and retaining nut, for example, a snap-fit retaining cap.

A clamp strut 17 is attached at one end to the first chassis member 11 and extends outwardly therefrom away from the second chassis member 12. An attachment clamp 18 is disposed on the other end of the clamp strut 17 and is operable to detachably clamp onto a frame of a conventional pushchair 2. Furthermore, a second attachment clamp 19 is disposed at the end of the short side 12b of the second chassis member 12, and, as with the first attachment clamp, is operable to detachably clamp onto a frame of a conventional pushchair 2. The two attachment clamps 18, 19 together can thereby secure the device 1 of the invention to the side of the conventional pushchair 2. Each attachment clamp 18, 19 is pivotable relative to the clamp strut 17/chassis member 12 respectively, for reasons which will become apparent from the description hereafter.

Figure 5:
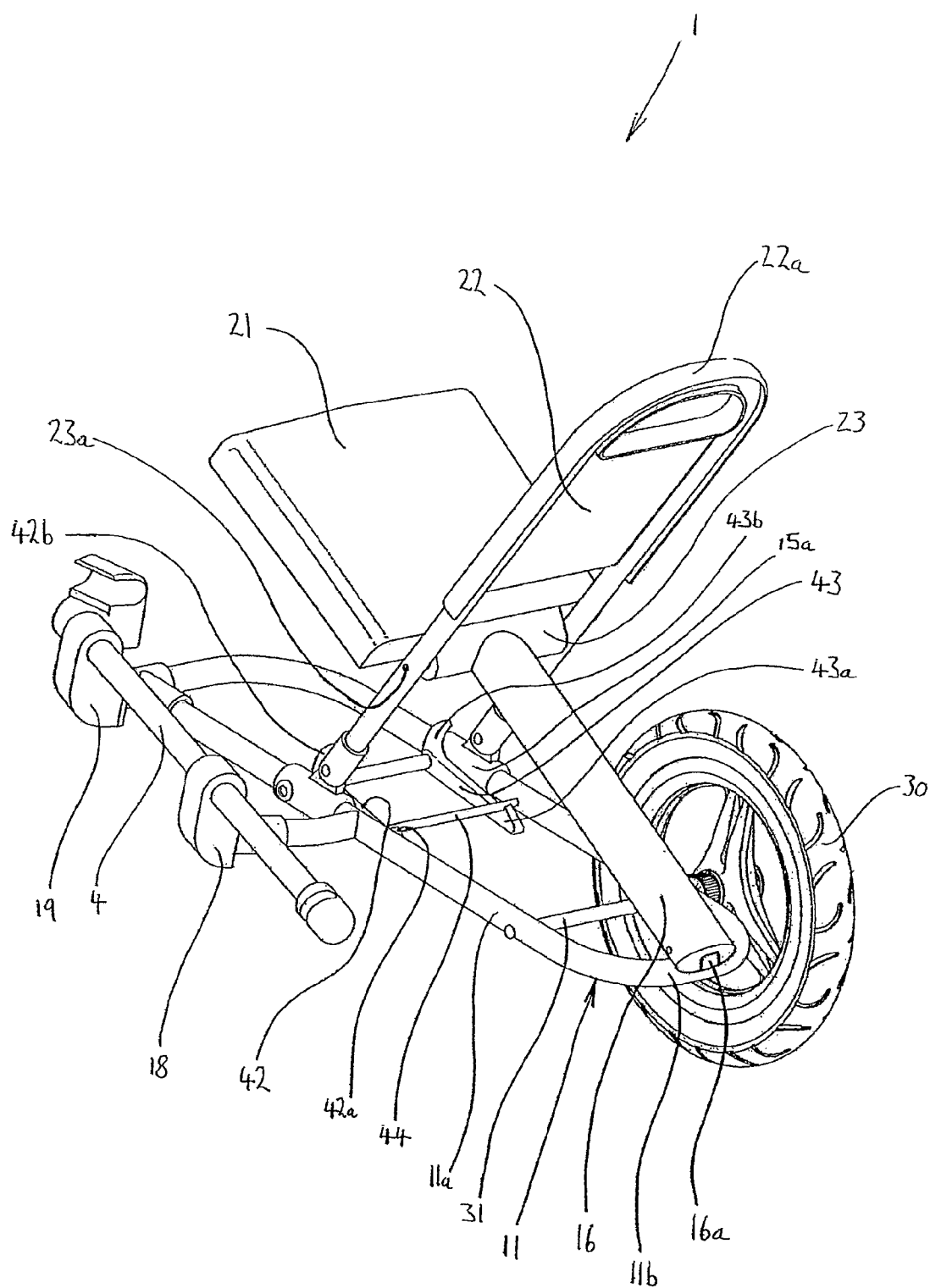
FIG. 5 shows a rear perspective view of the pushchair add-on device of FIGS. 1 and 3.
Figure 6:
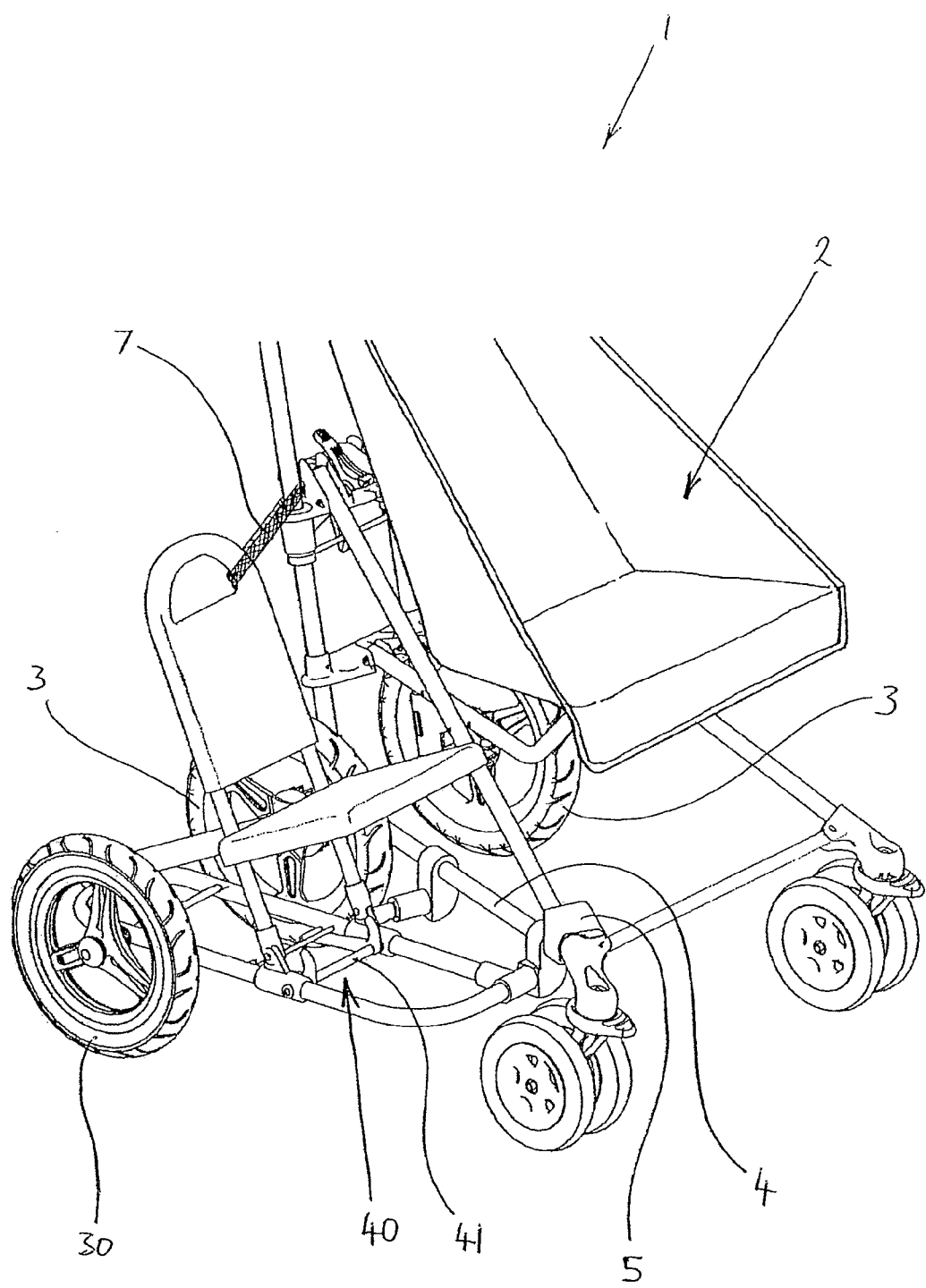
FIG. 6 shows the pushchair add-on device in the erect position attached to a conventional pushchair.

The device 1 includes a locking mechanism 40 to enable the seat portion 20 of the device 1 to be retained in the erected operative position (see FIGS. 5 and 6). The locking mechanism 40 comprises a locking shaft 41 that extends between the slidable collar pivot joints 14a, 15a and is rotatable about its axis relative to the collar pivot joints 14a, 15a. The locking shaft 41 therefore restricts the movement of one collar pivot joint 14a relative to the other 15a, so they can only be moved together and in the same direction. Two locking arms 42, 43 are rigidly secured to the locking shaft 41 and extend rearwardly therefrom, substantially parallel to the long sides 11a, 12a of the chassis members 11, 12. Each arm 42, 43 includes a latch portion 42a, 43a at an end distal from the locking shaft 41. A fixed shaft 44 extends between the chassis members 11, 12 and parallel to the locking shaft 41, and is positioned rearwardly of the locking shaft 41 such that the latch portions 42a, 43a of the arms 42, 43 are just able to be clipped over the fixed shaft 44 and held in this locked position hooked over the fixed shaft 44 by friction therewith. Therefore, when the arms 42, 43 are in this locked position, the collar pivot joints 14a, 15a are prevented from sliding along sections $L_{11}$, $L_{12}$ of the chassis members 11, 12 respectively, and thereby retain the seat portion 20 in the erect operative position.

As described above, the locking mechanism 40 enables the seat portion 20 of the device 1 to be locked in the erected operative position, and thereby capable of supporting a child thereon in a sitting position next to a child sitting in the pushchair 2 so that they are both facing in the same direction. When the device 1 is not in use, the locking mechanism 40 can be released by unclipping the latch portions 42a, 43a from the fixed shaft 44 and rotating the arms 42, 43 downwards. This can be done by pushing lever release tabs 42b, 43b which are formed on the end of the rotating arms 42, 43 perpendicular thereto and at the end distal from the latch portions 42a, 43a. This will allow the collar pivot joints 14a, 15a to freely slide along sections $L_{11}$, $L_{12}$ of the chassis members 11, 12 respectively. The base 21 and seat stanchion 16 can then pivot downwards about the pivot joint 16a, and the backrest 22 and backrest stanchions 14, 15 can pivot downwards about the collar pivot joints 14a, 15a, the backrest stanchions 14, 15 pivoting relative to the seat stanchion 16 about the hinge rod 23a in a scissor-like motion as described above, until the seat portion 20 of the device 1 is in the collapsed position.

Figure 7:
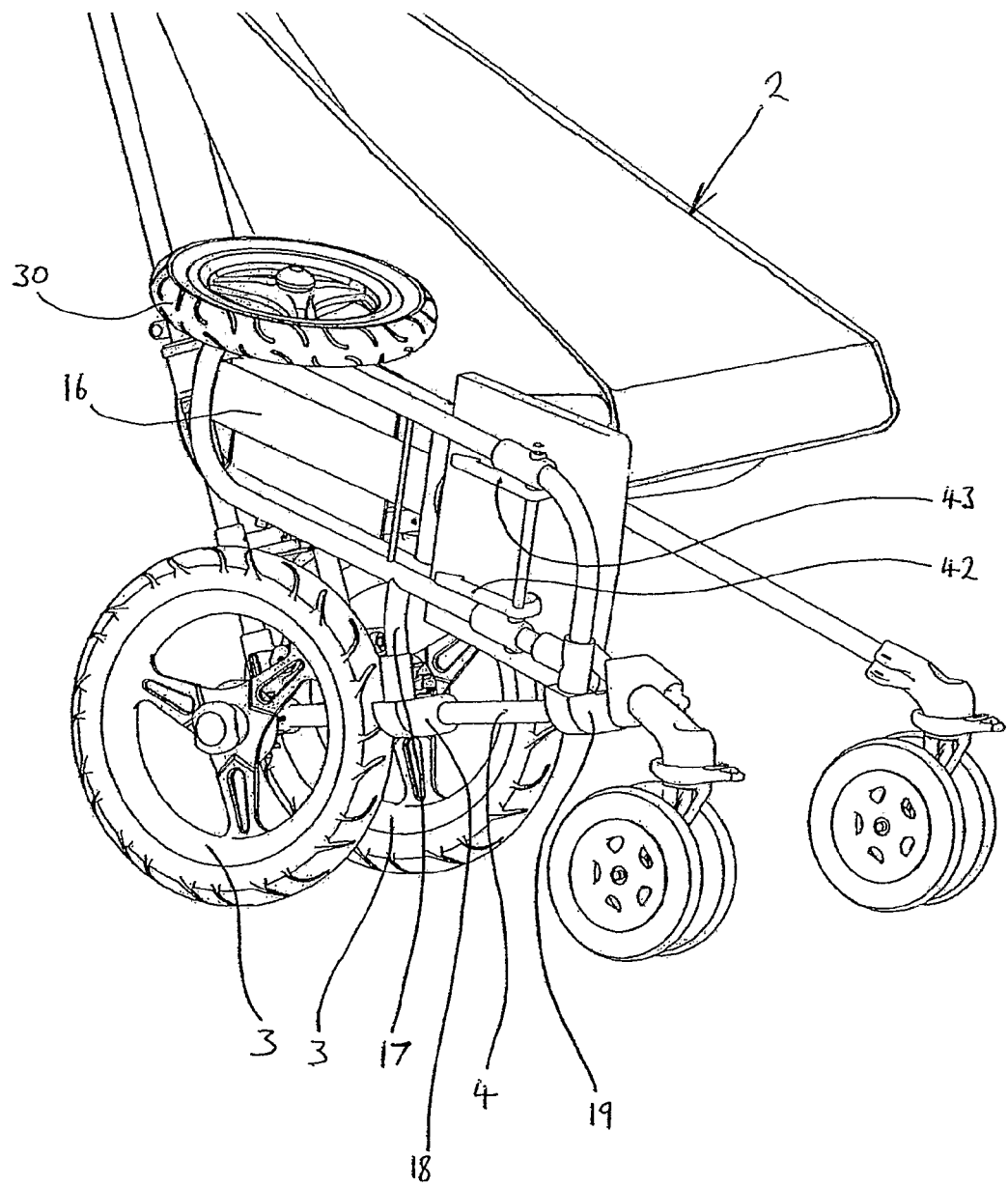
FIG. 7 shows the pushchair add-on device in the collapsed position attached to a conventional pushchair, and folded up in a storage position.
Figure 8:
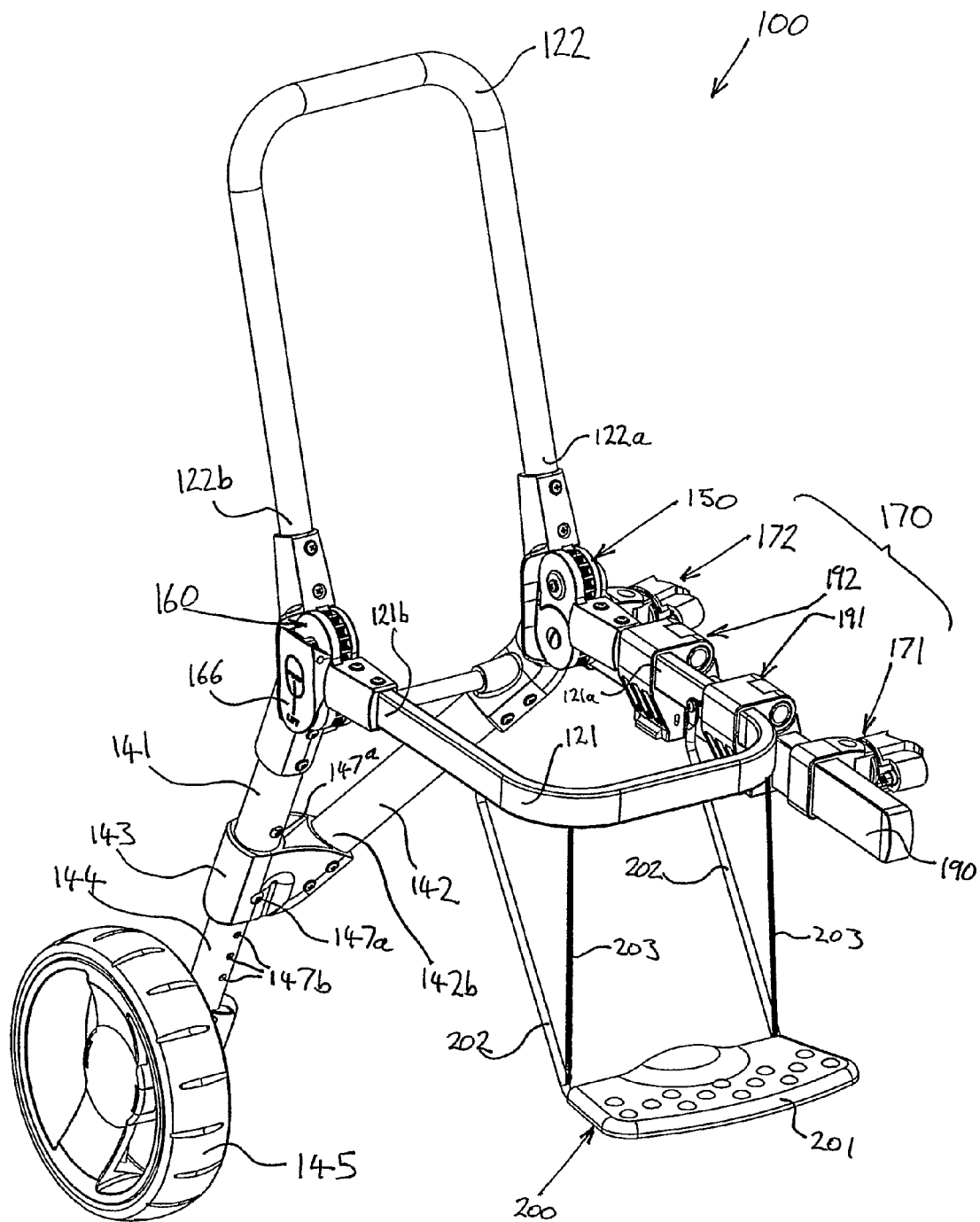
FIG. 8 is a perspective view of a second embodiment of a pushchair add-on device according to the invention, in an operative position with the base and backrest removed.
Figure 9:
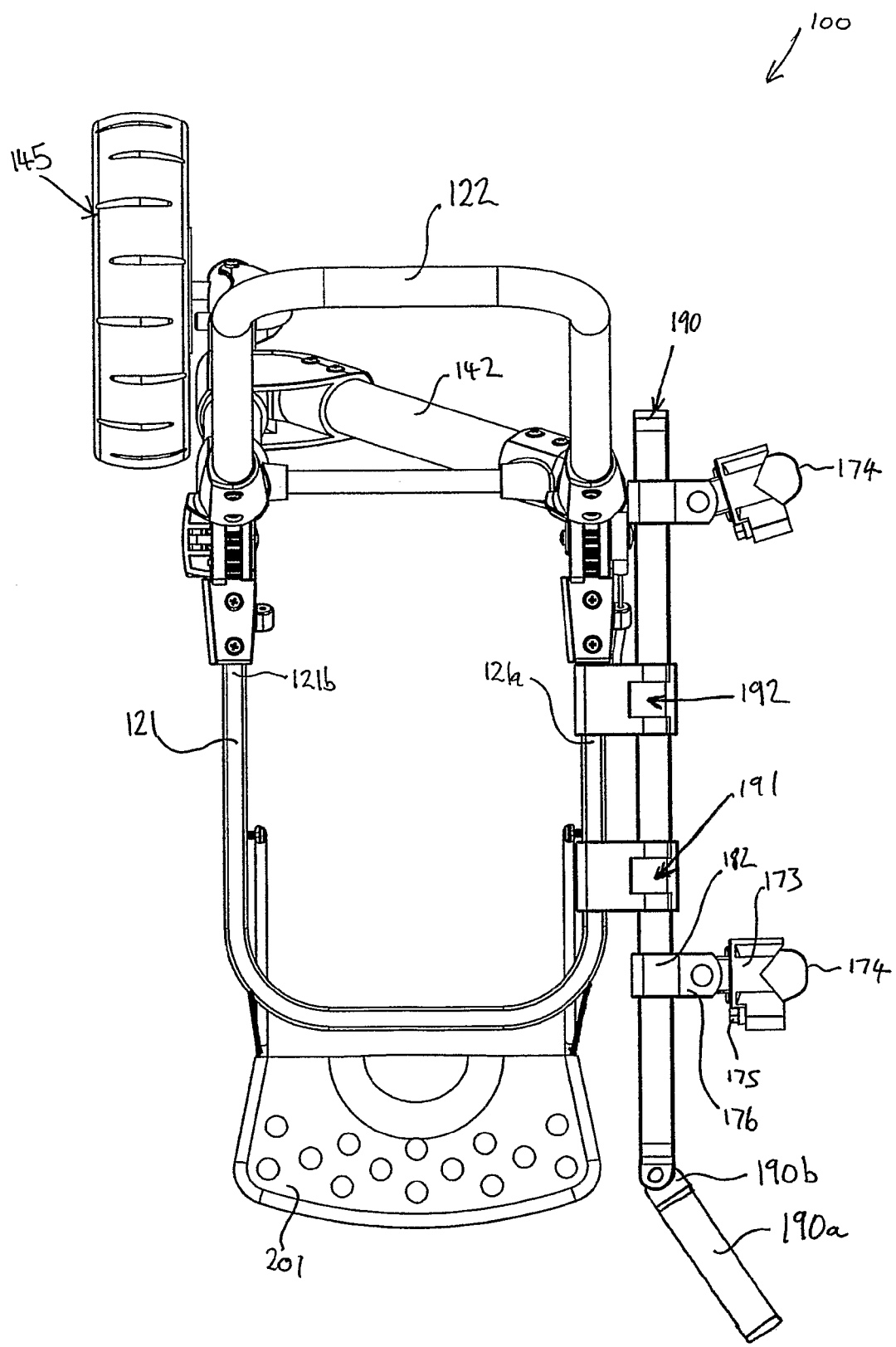
FIG. 9 is a plan view from above of the seat of FIG. 8.
Figure 10:
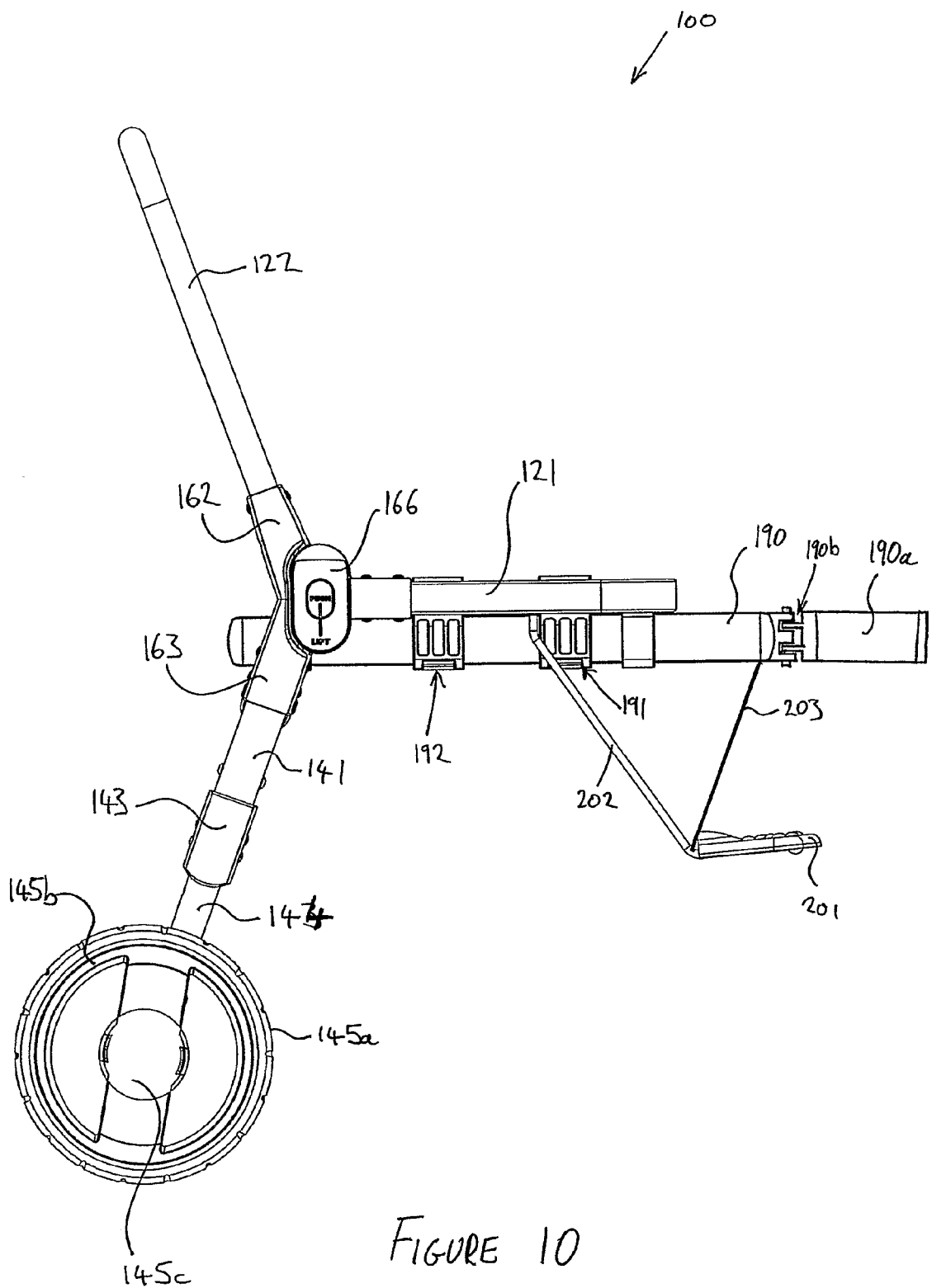
FIG. 10 is a side view of the seat of FIGS. 8 and 9.
Figure 11:
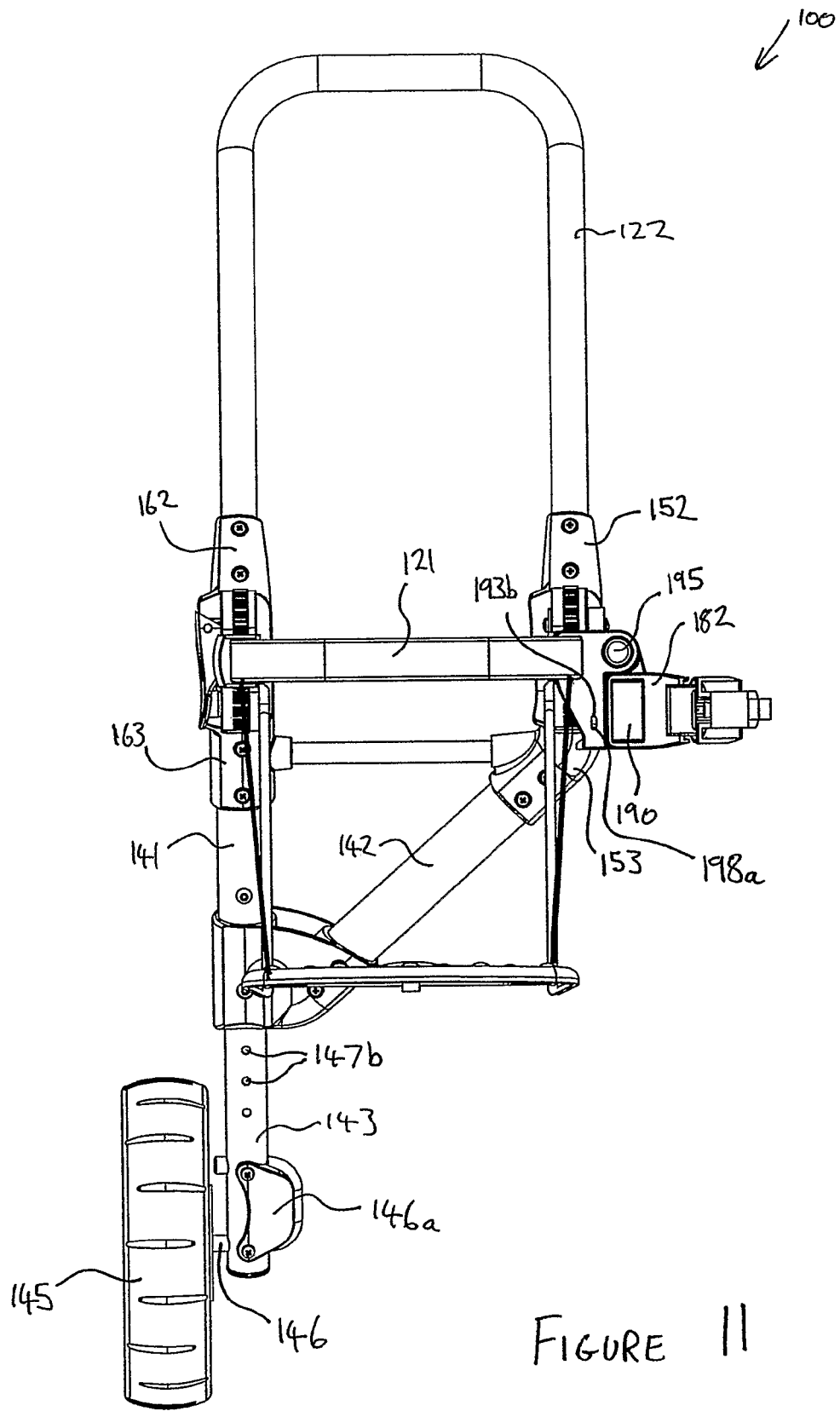
FIG. 11 is a front view of the seat of FIGS. 8-10.
Figure 12:
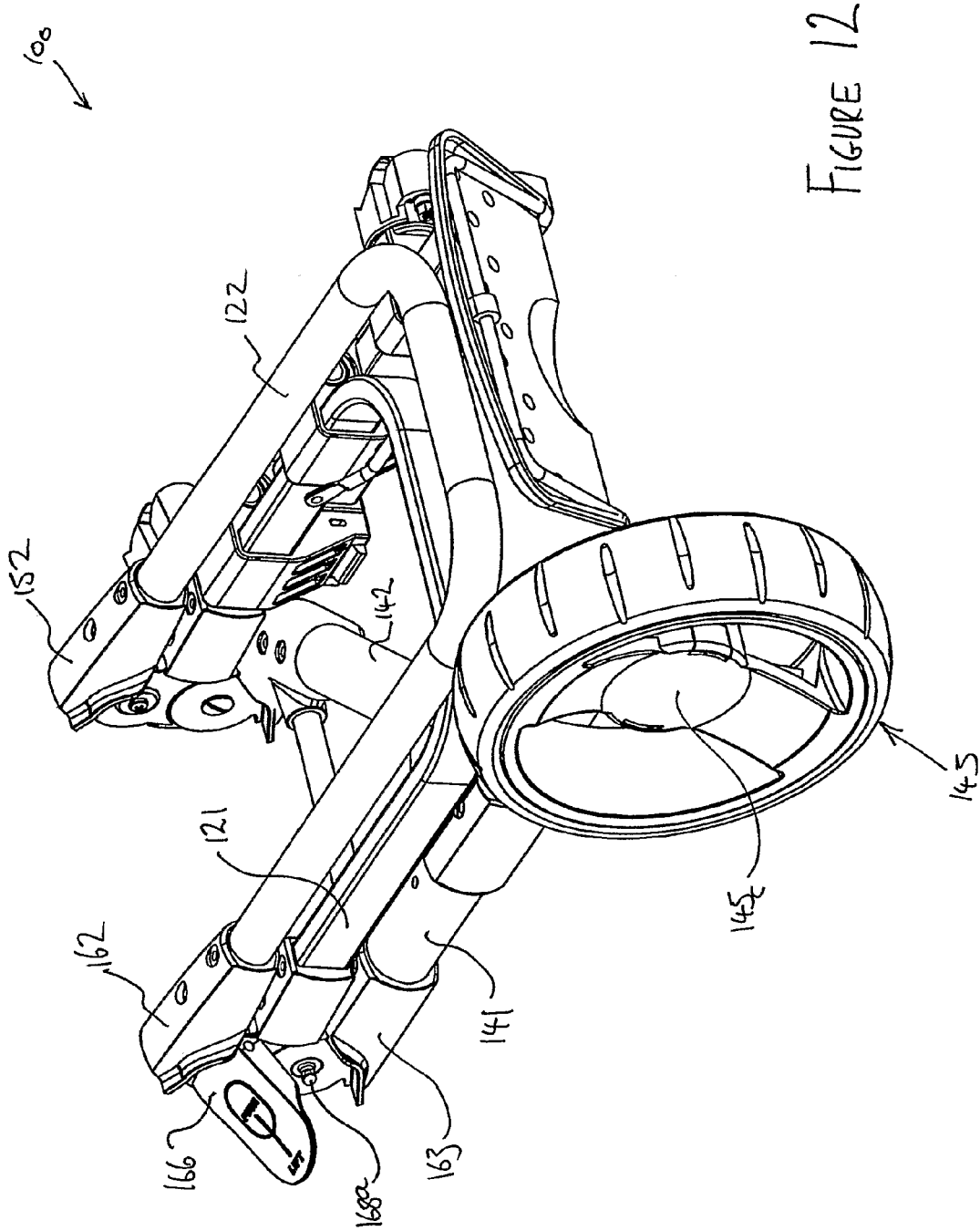
FIG. 12 is a perspective view of the seat of FIGS. 8-11 in a collapsed position.
Figure 13:
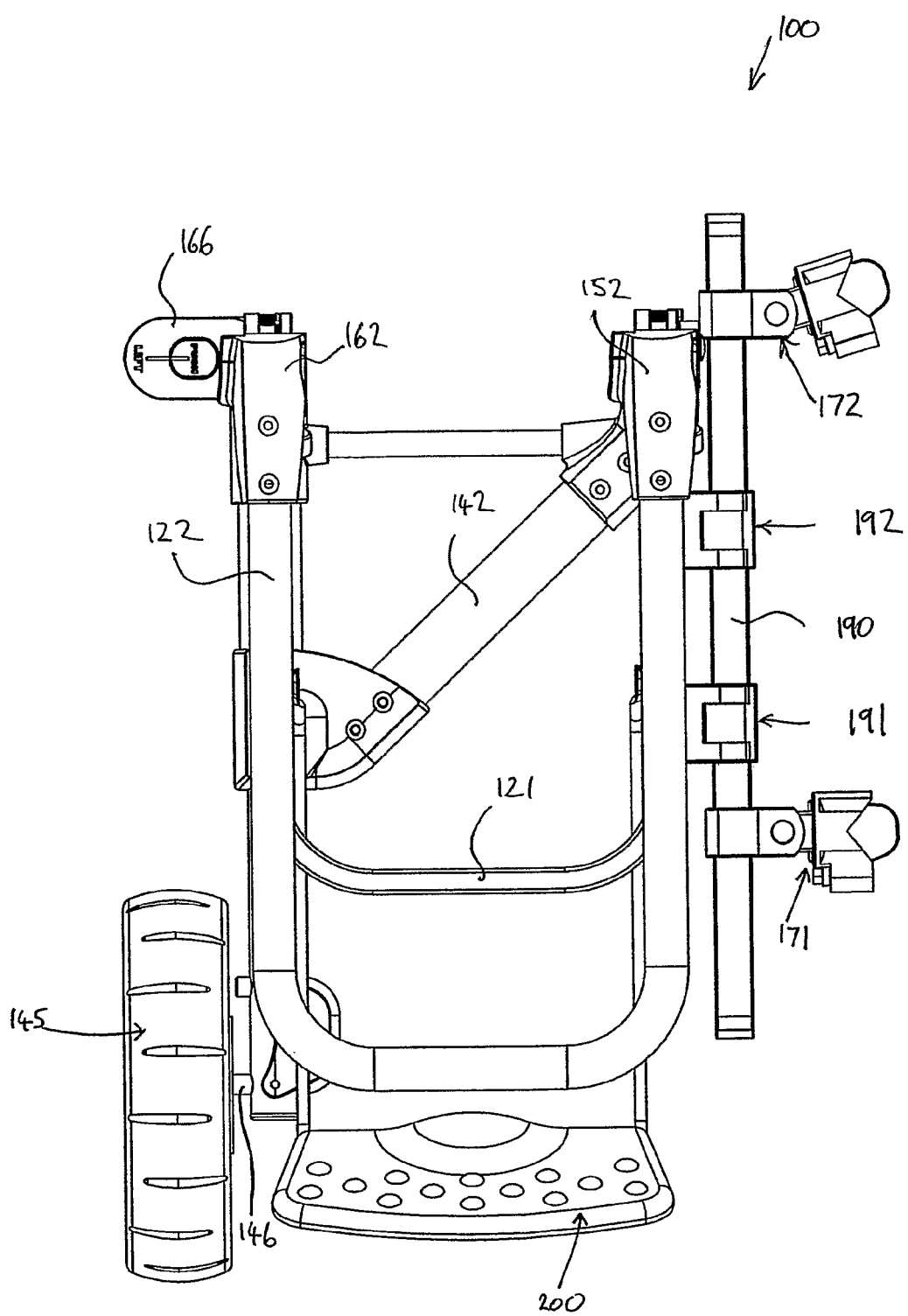
FIG. 13 is a plan view from above of the seat of FIG. 12.
Figure 14:
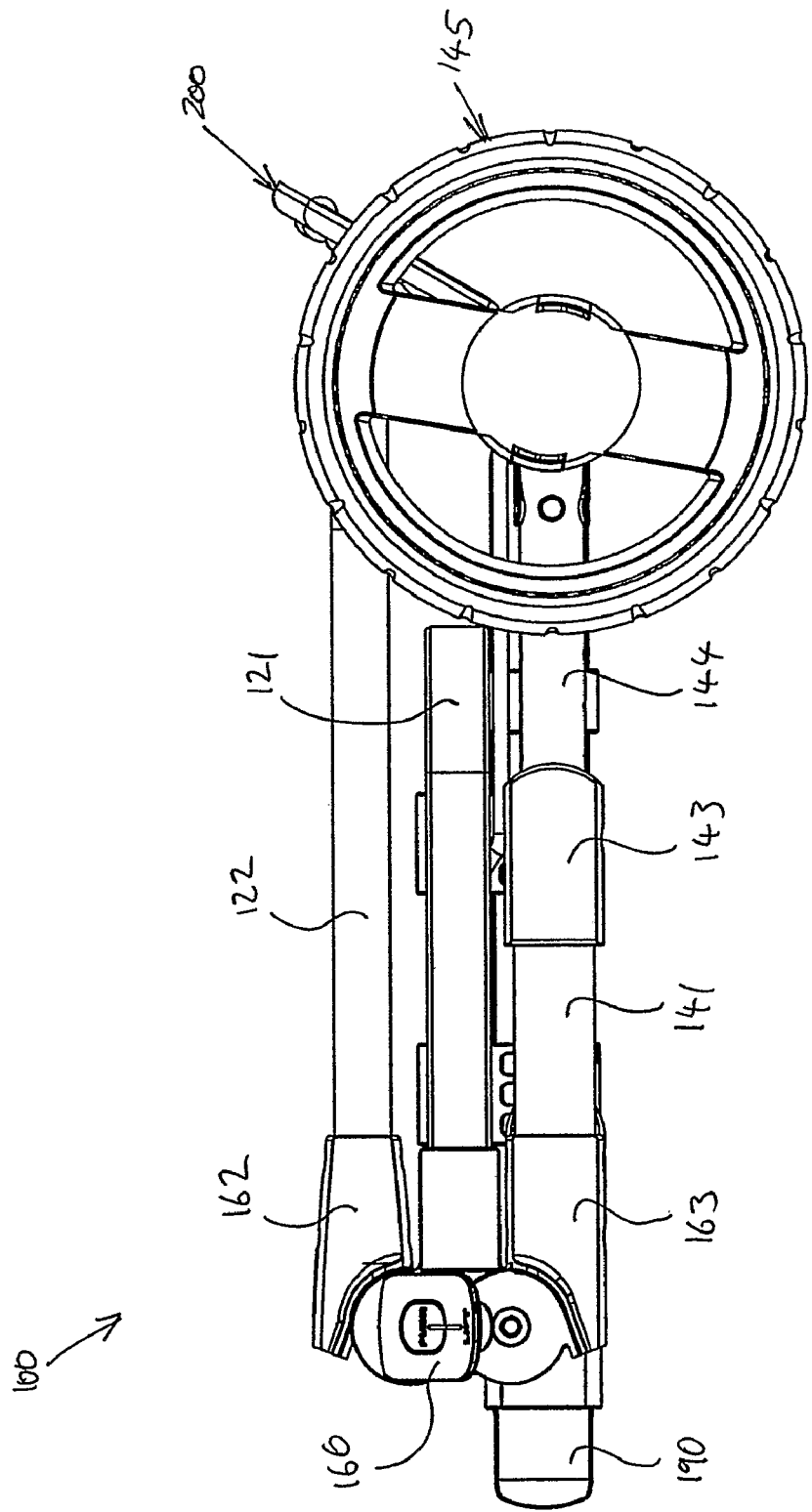
FIG. 14 is a side view of the seat of FIGS. 12 and 13.
Figure 15:
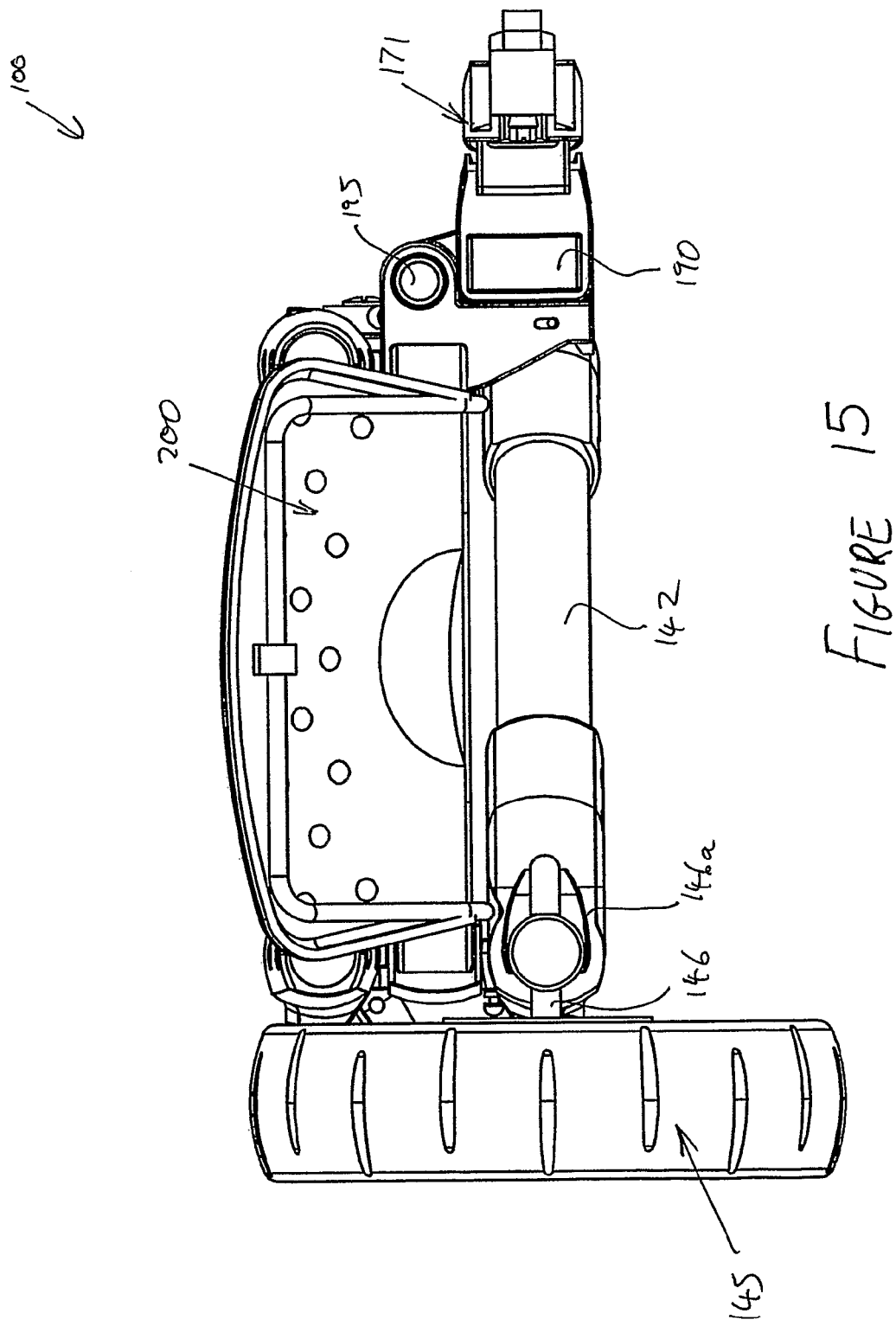
FIG. 15 is a front view of the seat of FIGS. 12-14.
Figure 16:
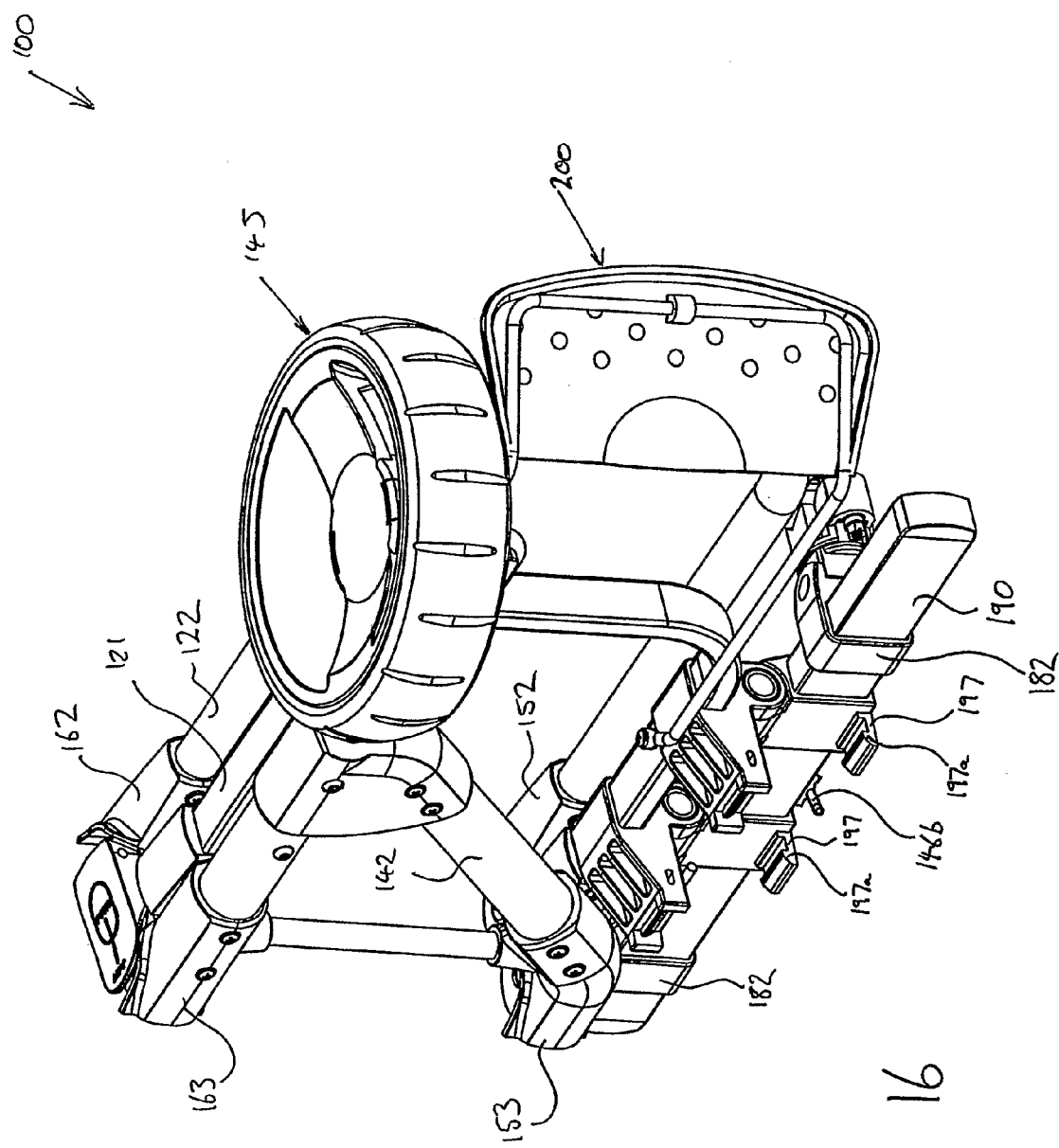
FIG. 16 is a perspective view of the seat of FIGS. 8-15, collapsed and folded up in a storage position.
Figure 17:
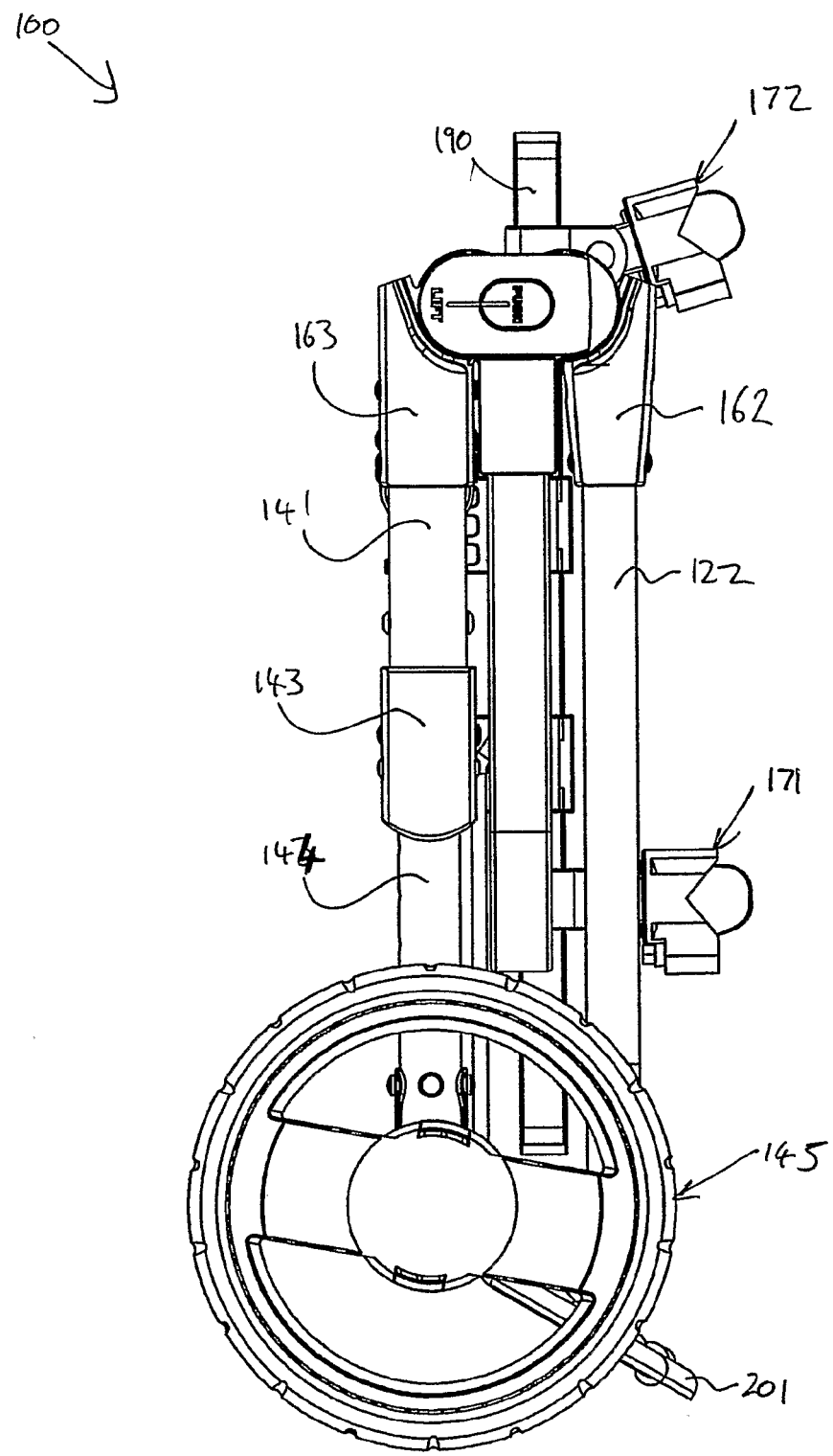
FIG. 17 is a plan view from above of the seat of FIG. 16.
Figure 18:
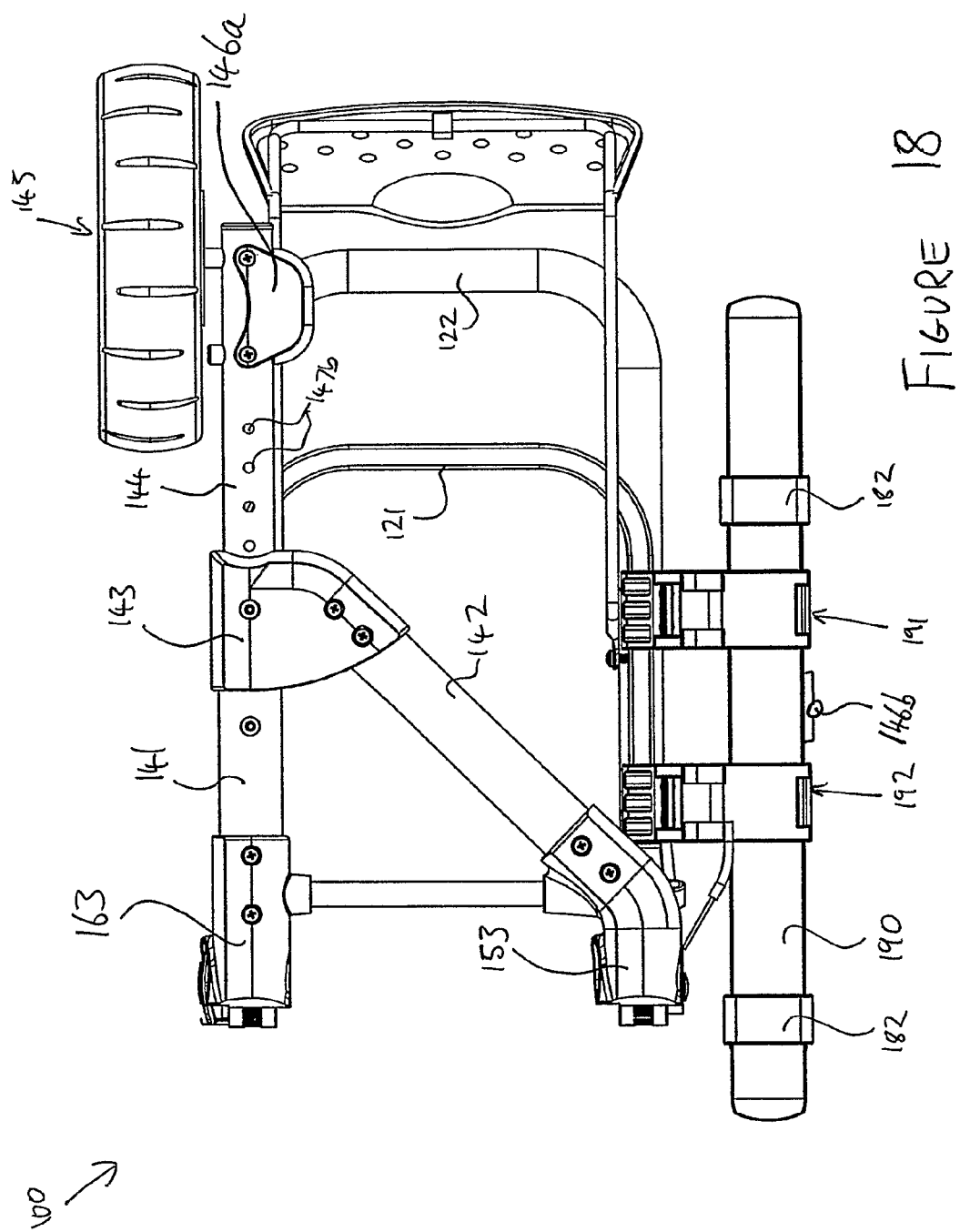
FIG. 18 is a side view of the seat of FIGS. 16 and 17.
Figure 19:
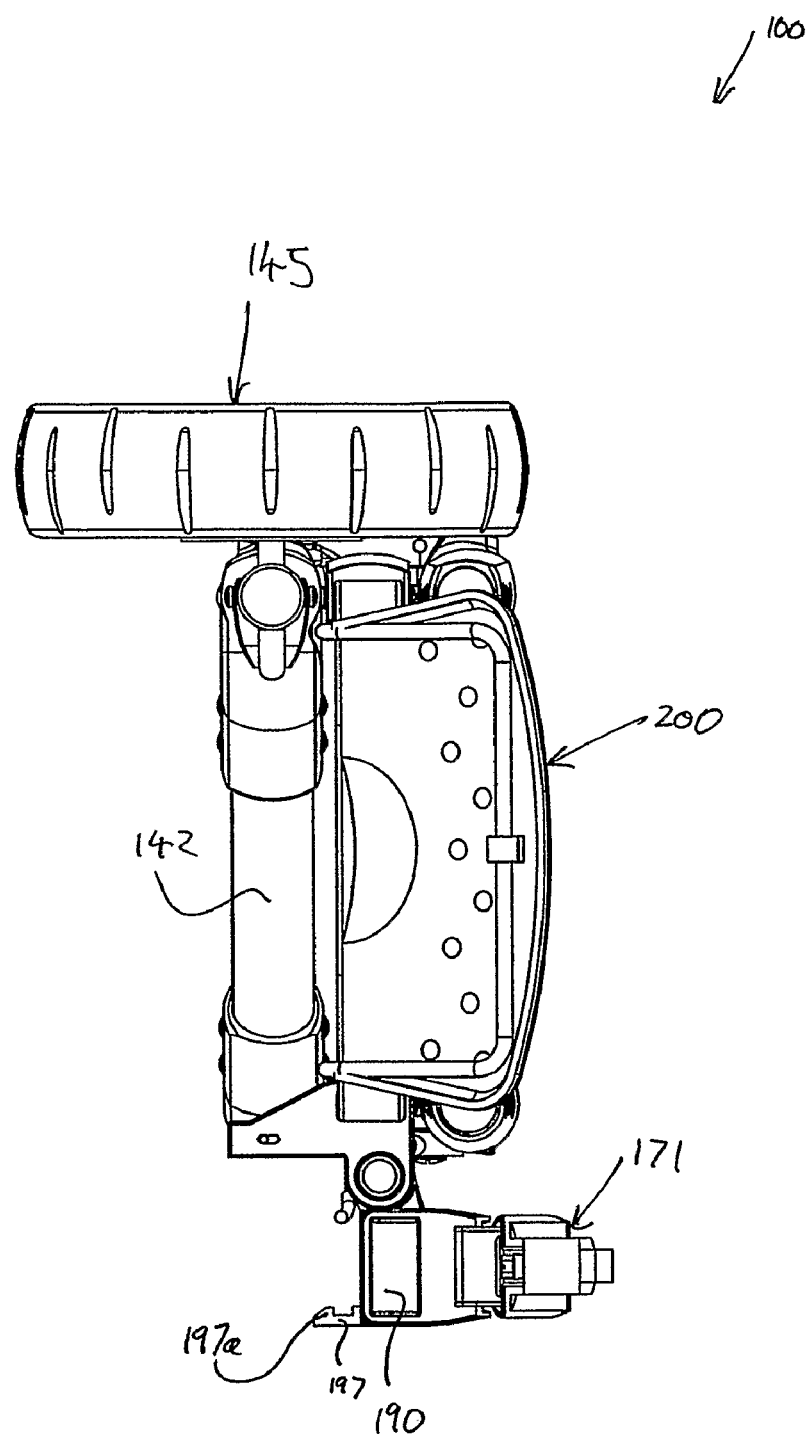
FIG. 19 is a front view of the seat of FIGS. 16-18.
Figure 20B:
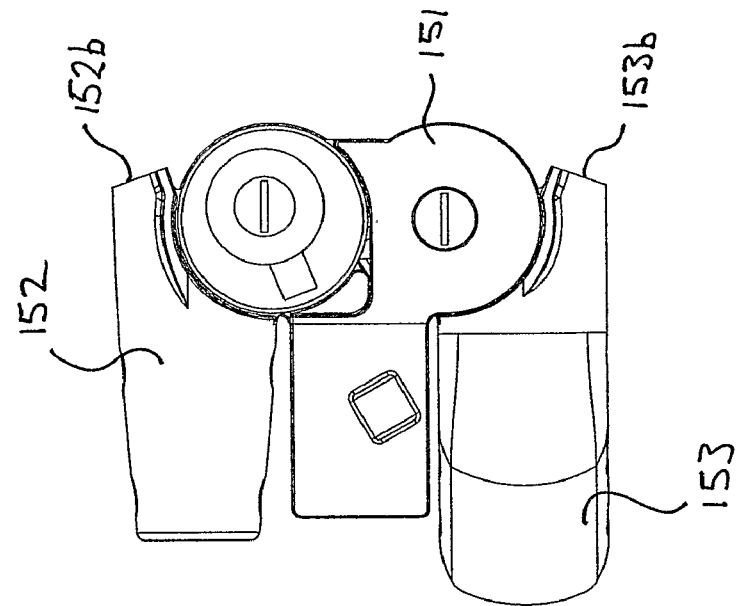
FIGS. 20A-20B are side views of the left hinge bracket.
Figure 20A:
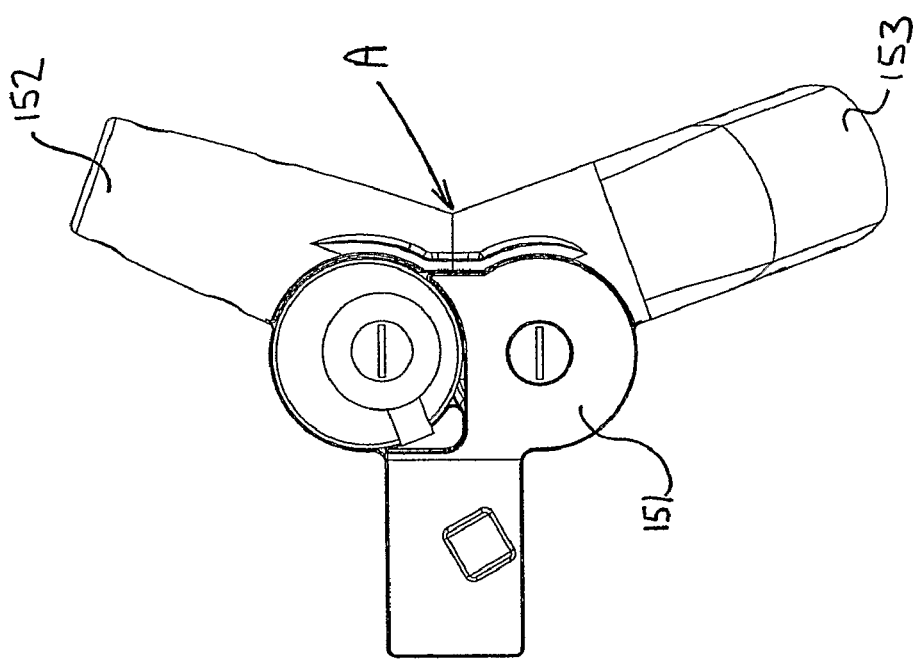
Figure 21:
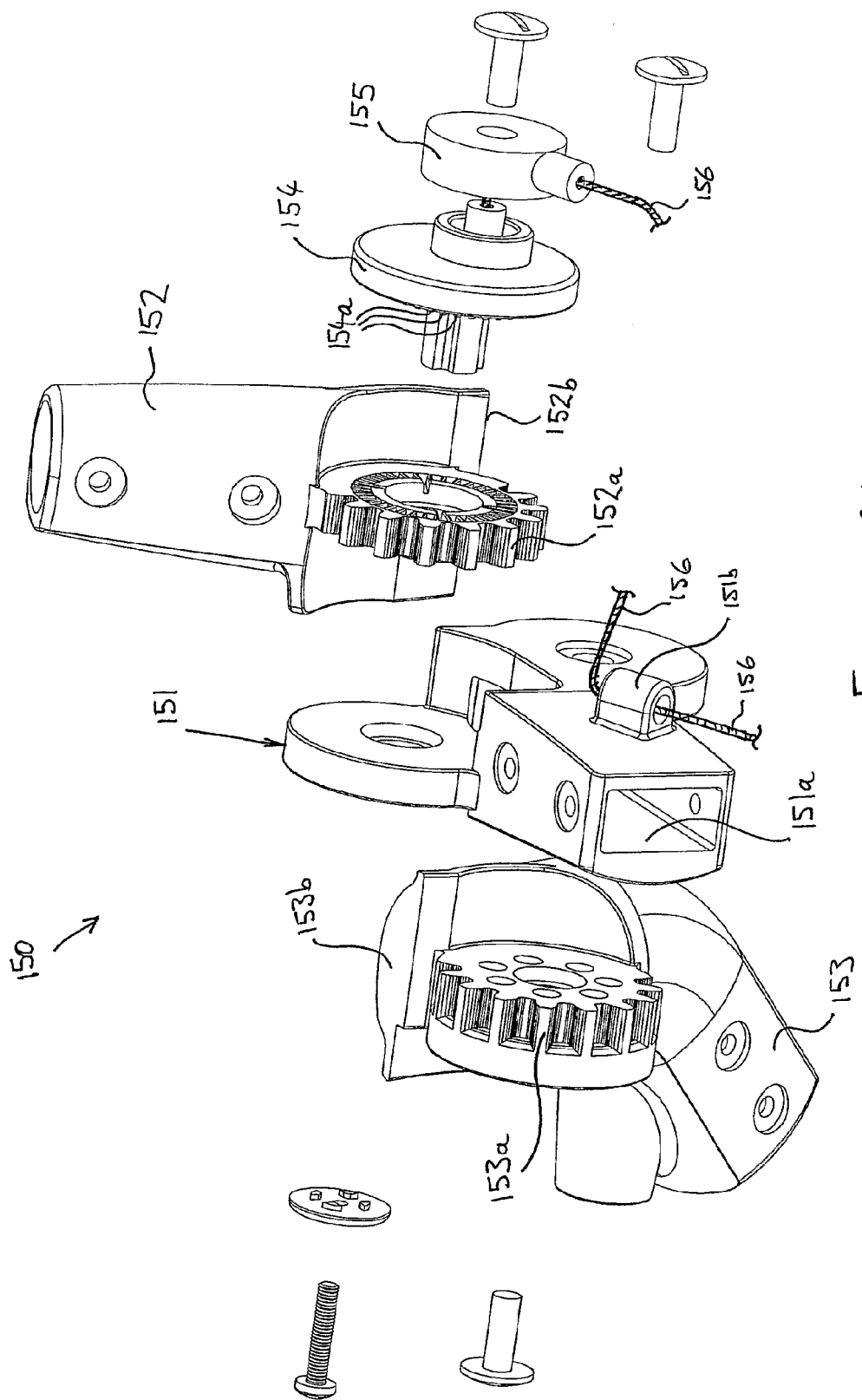
FIG. 21 is an exploded perspective view of the left hinge bracket of FIGS. 20A and 20B.
Figure 23:
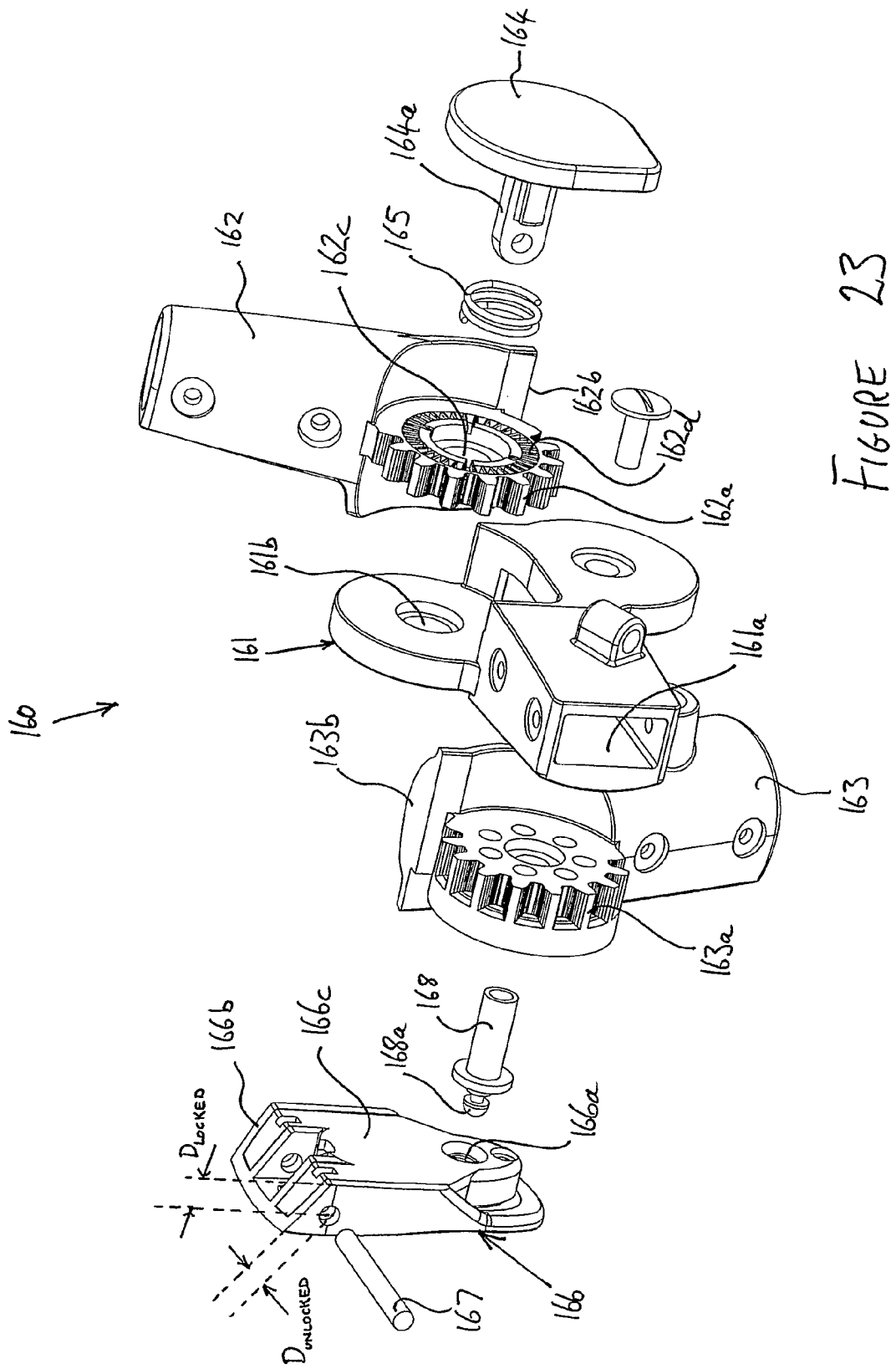
FIG. 23 is an exploded perspective view of the right hinge bracket of FIGS. 22A-22E.
Figure 24:
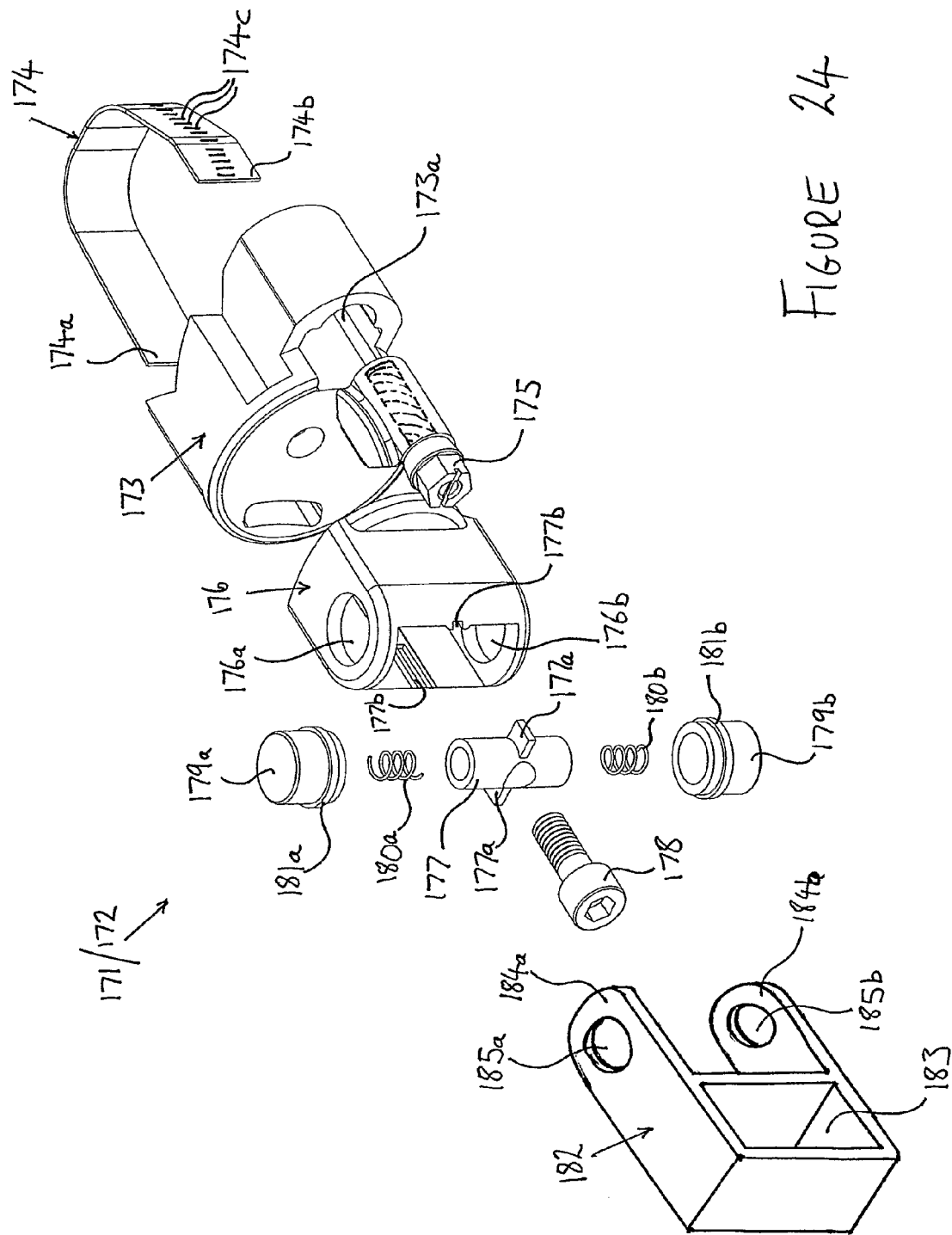
FIG. 24 is an exploded perspective view of a frame clamp.
Figure 25:
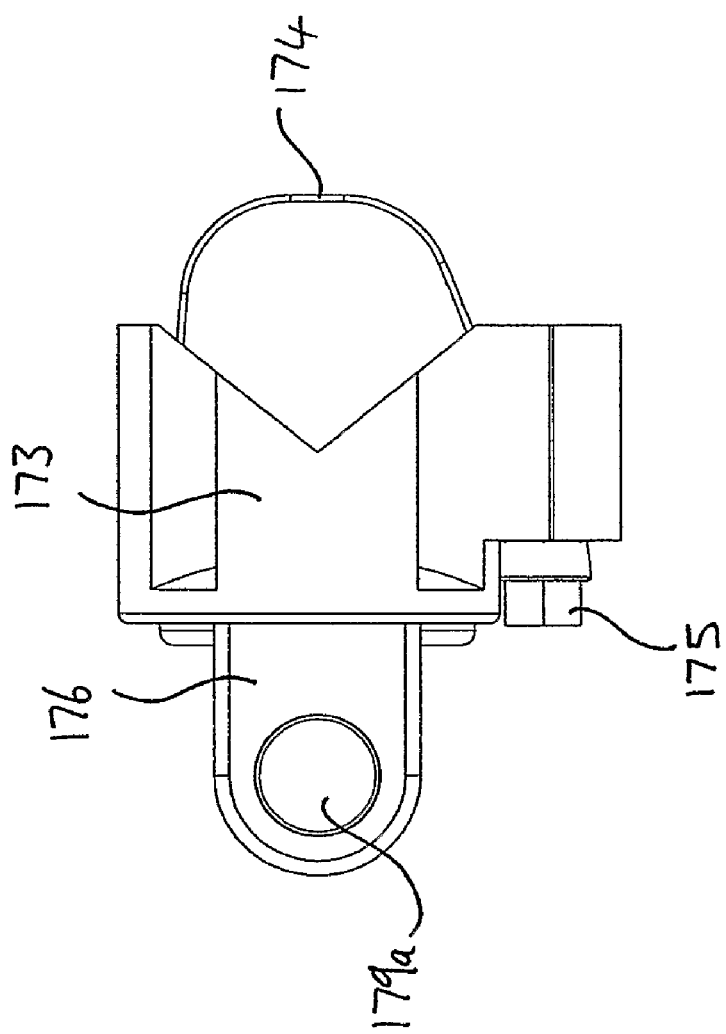
FIG. 25 is a plan view from above of an assembled frame clamp of FIG. 24.
Figure 26:
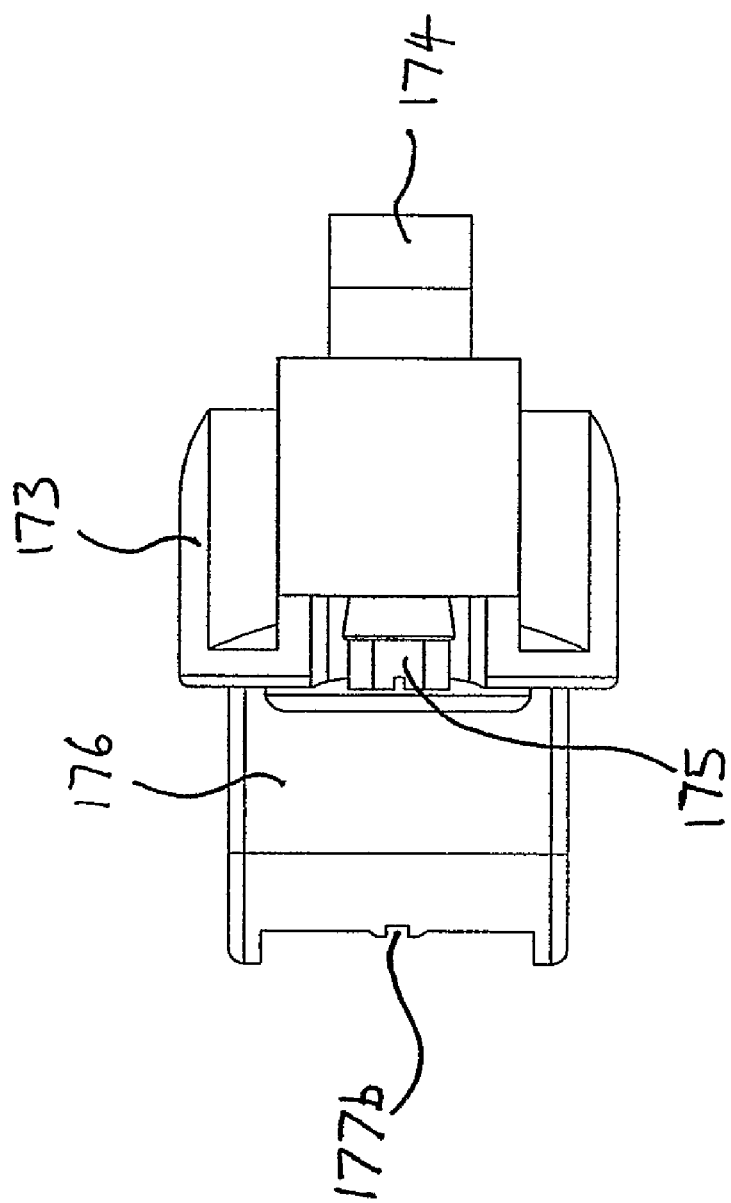
FIG. 26 is a side view of the frame clamp of FIG. 25.
Figure 27:
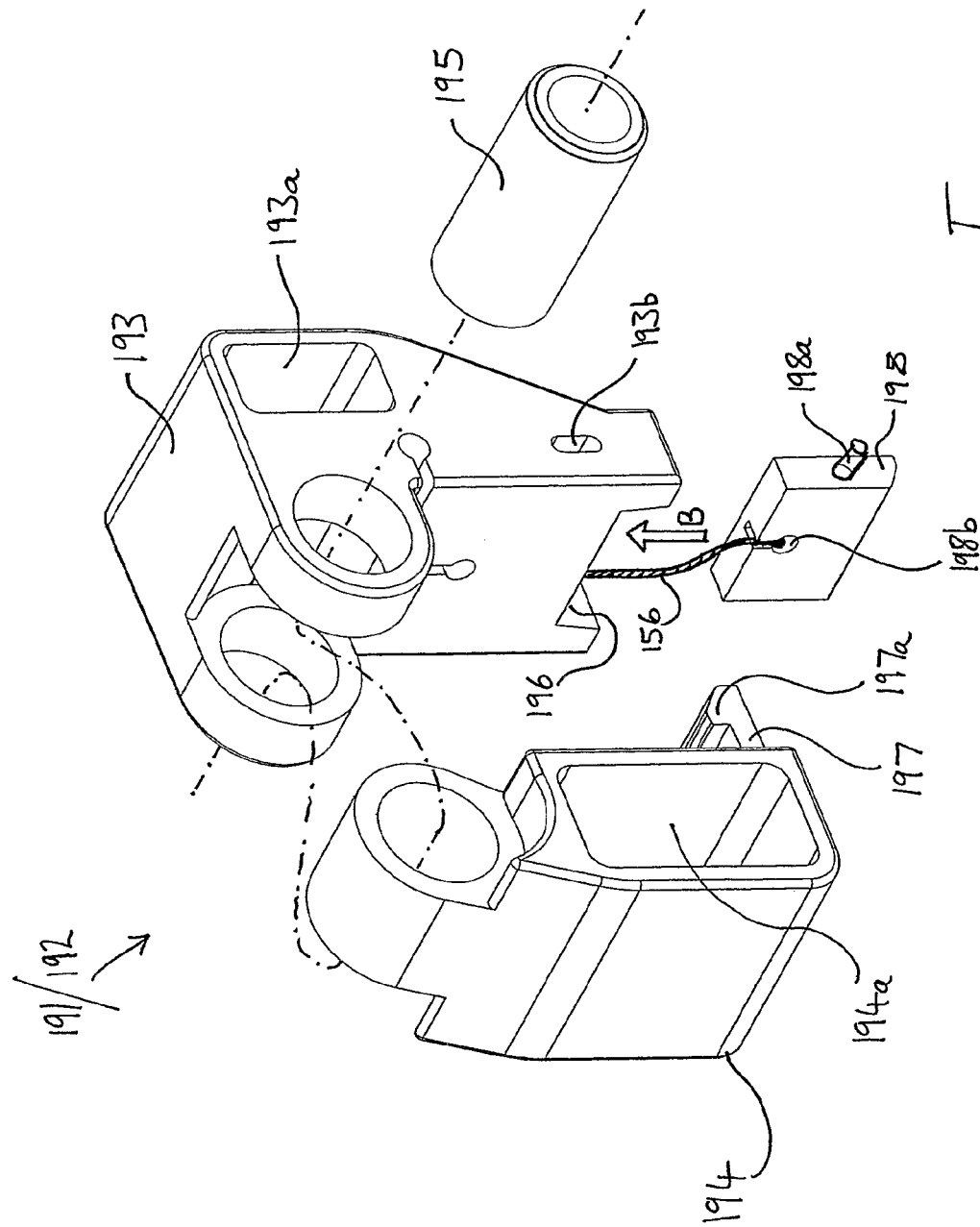
FIG. 27 is an exploded perspective view of a hinged frame clip.
Figure 28:
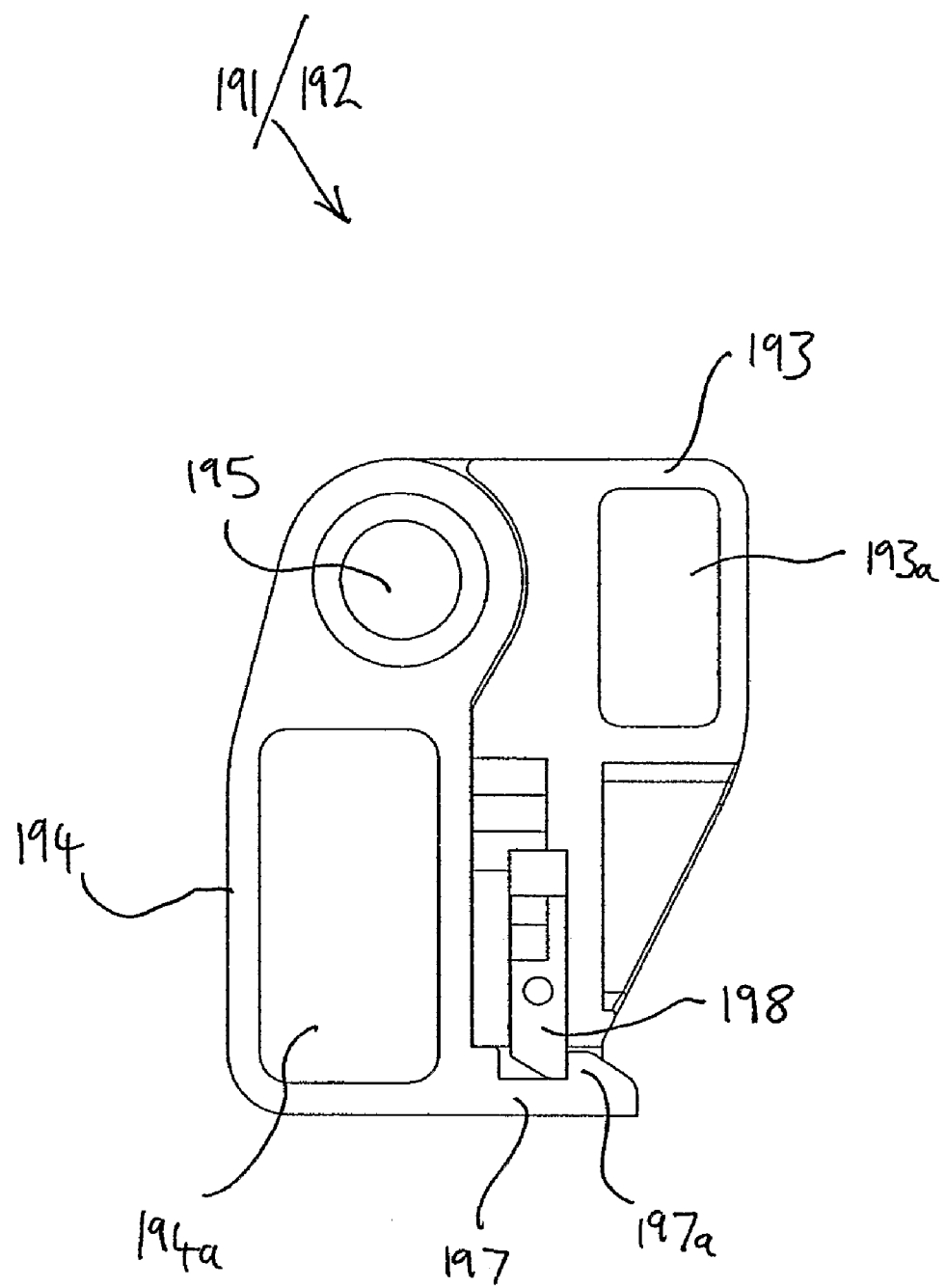
FIG. 28 is an end view of an assembled frame clip of FIG. 27.
Figure 29:
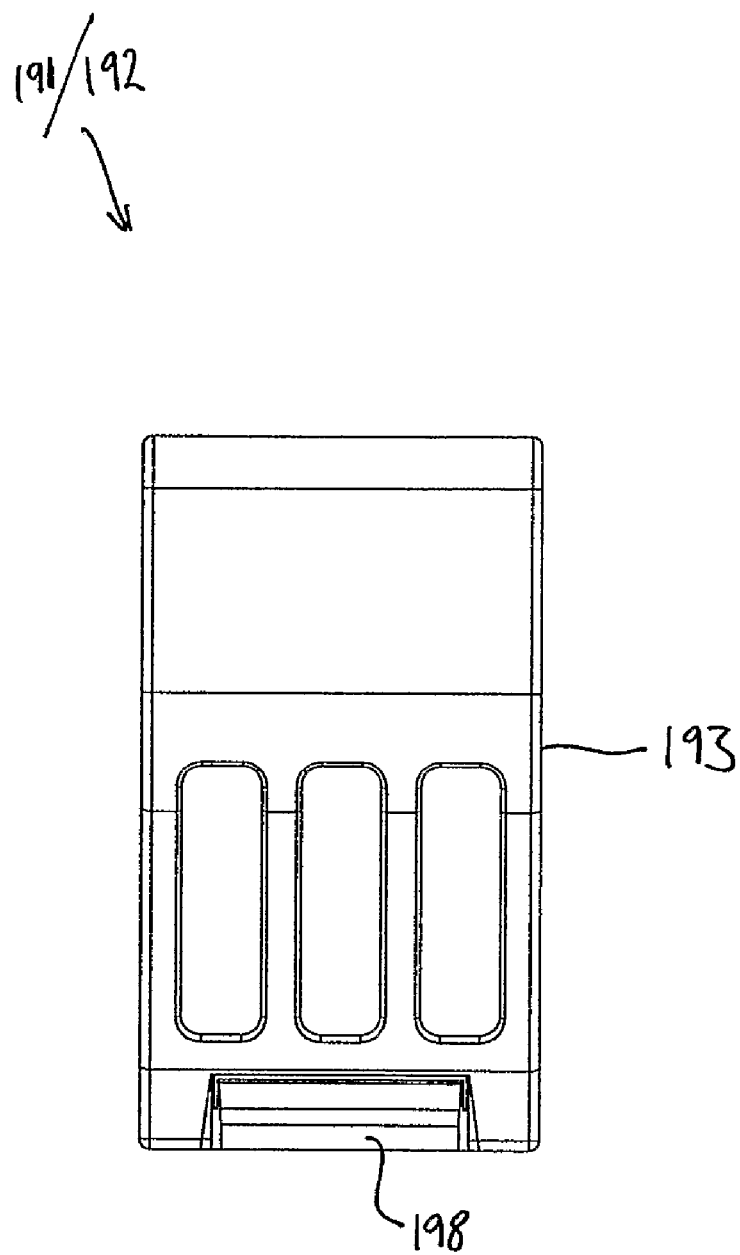
FIG. 29 is a side view of the frame clip of FIG. 28.

Once the device 1 has been put into the collapsed position shown in FIGS. 2 and 4 and as described above, it can be folded up against the side of the conventional pushchair 2 into the storage position, as shown in FIG. 7. This is possible due to the attachment clamps 18, 19 being pivotable relative the clamp strut 17/chassis member 12 respectively, as described above. Once the device 1 has been folded into this storage position, is can be held in place by a retaining means such as a clip (not shown).

With the device 1 in the storage position, the pushchair 2 has a much slimmer profile and will fit through normal doorways with ease. However, if a user wishes to neaten the appearance of the pushchair 2 and device 1 combination further, and make it even slimmer, they may unscrew the wheel retaining nut 32 and remove the wheel 30 from the axle shaft 31.

As can be seen in FIG. 6, one of the advantages of the present invention is that when it is attached to a pushchair 2 and is not in the folded storage position, the wheel 30 of the device 1 is aligned with or is coaxial with wheels 3 of the pushchair 2. This means that the pushchair 2 and device 1 combination can be tilted backwards on all three wheels 30, 3 about their common contact line on the ground or their common axis, in order to get up a kerb, for example, and so is much more easily manoeuvrable than a conventional pushchair 2 would be with any of the other known add-on devices.

It is intended that the attachment clamps 18, 19 of the device 1 are suitable to attach to a frame of any conventional pushchair 2. However, some pushchairs currently available may not have side frames compatible with the attachment clamps 18, 19, and so it is envisaged that the device may be supplied with a replacement section of pushchair frame 4 that can be substituted for the relevant section of the original frame to allow the device to be attachable thereto. The specific replacement section of frame 4 could be pushchair-specific, so that a user could identify which pushchair they already own, and purchase a device of the present invention that comes with the appropriate replacement frame section.

In an alternative attachment mechanism to that described above, a universal supplementary section of frame 4 could be provided. This supplementary section 4 would be attachable to the attachment clamps 18, 19 and could further include pushchair-specific attachment means 5, 6 to couple the device 1, via the supplementary frame section 4, to the pushchair 2. Therefore, instead of replacing a section of the existing pushchair frame, there would be an additional section of frame 4. In this case, the user would identify which pushchair they already own, and purchase a device 1 of the present invention that comes with the appropriate pushchair-specific attachment means 5, 6 to enable the device 1 to be fitted to their pushchair 2.

In a further embodiment of the invention, a strap 7 may be connected between a top part 22a of the backrest 22 and a part of the pushchair 2 which is higher than the top 22a of the backrest 22 (see FIG. 6). This strap 7 prevents the auxiliary seat device 1 from pivoting downwards about the attachment clamps 18, 19 relative to the pushchair 2 if the wheel 30 runs over a hole or drops off a kerb, for example. In such a scenario, the weight of the auxiliary seat device 1 (and a child thereon) is transferred through the strap 7 to the pushchair 2 and is balanced out by the weight of said pushchair 2 and of a child in the pushchair seat. It will be appreciated that this means of preventing the auxiliary seat device 1 from pivoting downwards beyond a certain angle does not necessarily need to be a strap 7 as shown in FIG. 6. For example, a rigid rod could be used secured to the pushchair 2 and some suitable point on the auxiliary seat device 1.

Referring now to FIGS. 8-31, a second embodiment 100 of an add-on pushchair seat of the invention is shown. As with the first embodiment described above, the second embodiment is also attachable to a frame of any conventional pushchair to provide a secondary side seat for a second child to sit on, in addition to a first child seated in the pushchair itself.

The second embodiment of an add-on seat 100 of the invention generally comprises a folding support frame 120 having a seat or base frame member 121 and a backrest frame member 122, and a wheel mechanism 140 including a wheel 145 in contact with the ground when the add-on seat 100 is in an operative position. An attachment mechanism 170 is provided to enable the add-on seat 100 to be secured to a conventional pushchair.

The base frame member 121 and the backrest frame member 122 are both substantially 'U'-shape frame members, each having a respective first (left-side) distal end 121a, 122a, and respective second (right-side) distal end 121b, 122b. The base frame member 121 and the backrest frame member 122 are pivotally connected to each other at their first distal ends 121a, 122a and at their second distal ends 121b, 122b by left and right hinge brackets 150, 160 respectively.

Figure 31:
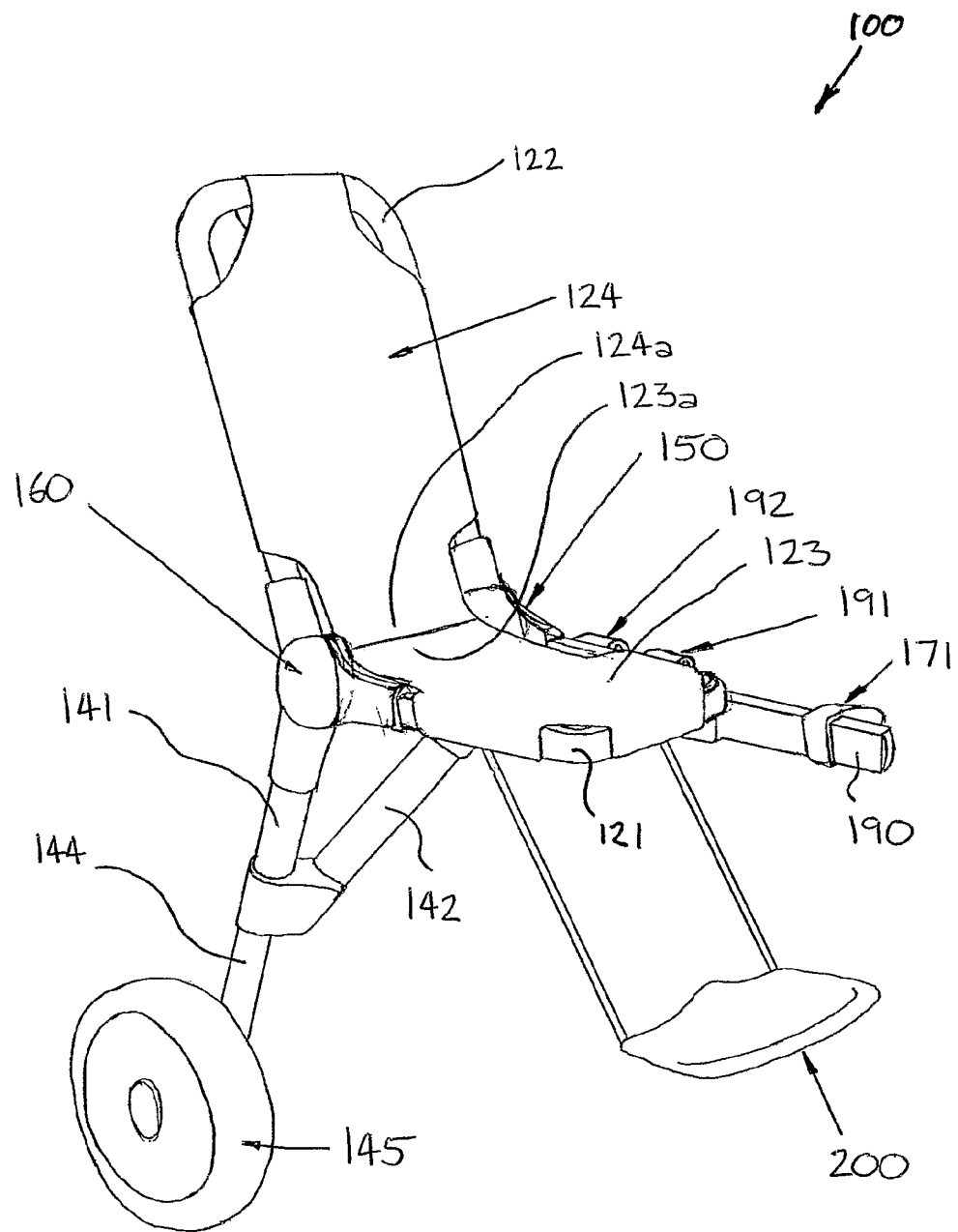
FIG. 31 is a perspective view of the seat of FIGS. 8-19 with the base and backrest covers in place.

A seat covering 123 is attached to the base frame member 121, and a backrest covering 124 is attached to the backrest frame member 122 (see FIG. 31). The seat covering 123 provides the seat for a child to sit on when the add-on seat 100 is in use, and the backrest covering 124 provides a surface for the seated child to lean against. Both the seat covering 123 and the backrest covering 124 are preferably made of a flexible material such as a fabric or a flexible plastic and are attached to each other at their adjacent edges 123a, 124a. The seat covering 123 and the backrest covering 124 are both tensioned across the base frame member 121 and backrest frame member 122 respectively. Alternatively, the seat covering and backrest covering could be made from a rigid plastic material.

A wheel mechanism 140 is connected to the folding support frame 120 at the hinge brackets 150, 160 and comprises a main wheel strut 141 pivotally attached at one end 141a to the right hinge bracket 160, and a diagonal bracing strut 142 pivotally attached at one end 142a to the left hinge bracket 150. The other end 142b of the bracing strut 142 is secured to the other end 141b of the main wheel strut 141 by a V-shaped moulded connector 143. This enables the main wheel strut 141 and the bracing strut 142 to be pivotable together about the left and tight hinge brackets 150, 160 from an operative position in which they extend away from the frame 120 (see FIGS. 8-11), to a collapsed position (see FIGS. 12-15) and a storage position (see FIGS. 16-19) in which they lie flat against the base frame member 121 of the folding support frame 120.

A third sliding wheel strut 144 is telescopically received in the main wheel strut 141 and is slidable relative thereto to move in and out thereof. A wheel 145 is rotatably and detachably attached to an axle 146 at the free end 144a of the sliding strut 144 remote from the main wheel strut 141. An axle bracket 146a is secured to the free end 144a of the sliding wheel strut 144 to support the axle 146 thereon. The sliding strut 144 is locked in a desired position within the main strut 141 by means of securing bolts 147a extending though the main strut 141 and through apertures 147b in the sliding strut 144. To alter the position of the sliding strut 144 within the main strut 141, and thereby the distance of the wheel 145 from the hinge brackets 150, 160, the securing bolts 147a are removed, the sliding strut 144 moved to the new position with the appropriate apertures 147b aligned with the bolts 147a in the main strut 141, and the bolts 147a are screwed in again through the apertures 147b. It will be appreciated that other unillustrated means of securing the sliding strut 144 within the main strut 141 are possible, for example, spring-biased buttons on the sliding strut 144 being received in apertures in the main strut 141. In such an embodiment, the sliding strut 144 could be adjusted by depressing the buttons into the sliding strut 144 so that they are clear of the holes in the main strut 141, and when the sliding strut 144 was located in the new desired position, the buttons would spring out into the nearest holes in the main strut 141 under spring bias to lock the sliding strut 144 in position.

Figure 30:
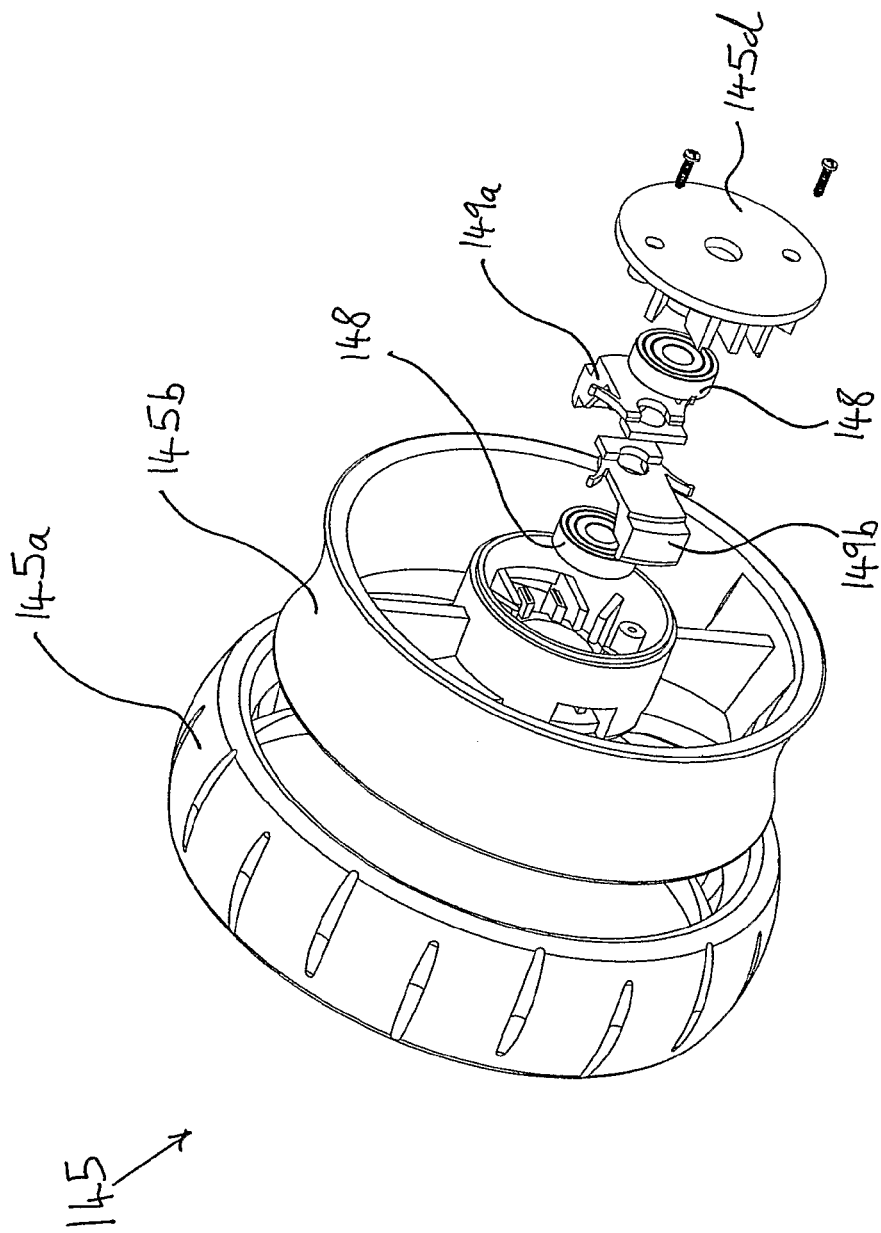
FIG. 30 is an exploded perspective view of the wheel.

The wheel 145 is releasably attached to the axle 146, and includes the attachement mechanism as shown in FIG. 30. The wheel 145 comprises a tyre 145a attached to a rim 145b. The rim 145b has a spring-biased button 145c at its centre (see FIG. 10 for example) which can be depressed into the rim 145b. The wheel also comprises two beatings 148 and two over-lapping axle-plates 149a, 149b, each with a hole therethrough, all contained within the rim 145b by a retaining plate 145d. In use, the wheel 145 is secured to the axle 146 by depressing the button 145c which is configured so as to push the two axle-plates 149a, 149b together so that the holes in each plate are aligned. The axle 146 can then be passed through a hole in the retaining plate 145d, through the first bearing 148, through the aligned holes in the axle-plates 149a, 149b, and through the second bearing 148. The button 145c is then released and the axle-plates move apart under the action of resilient spring arms on their sides pushing against a portion of the rim 145b, and lips on the axle-plates 149a, 149b then locate in a circumferential groove (not shown) in the axle 146 to hold the wheel 145 onto the axle 146. To release the wheel 145 from the axle 146, the process described above is reversed.

The left and right hinge brackets 150, 160 will now be described in more detail with reference to FIGS. 20-23. The left hinge bracket 150 comprises a housing plate 151, a backrest arm 152 and a wheel strut arm 153. The backrest arm 152 and the wheel strut arm 153 each include an integrally formed toothed cog portion 152*a*, 153*a*, and are rotatably secured to the housing plate 151 with the teeth of each cog portion 152*a*, 153*a* meshing. Therefore, when one arm is rotated, it causes the other arm to rotate. In use, the left side distal end 122*a* of the backrest frame member 122 is secured in an aperture in the backrest arm 152, and the one end 142*a* of the diagonal bracing strut 142 is secured in an aperture in the wheel strut arm 153. The housing plate 151 includes an aperture 151*a* which, in use, receives the left distal end 121*a* of the base frame member 121. The toothed cog portion 152*a* of the backrest arm 152 also includes a central aperture 152*c*, around which ratchet ridges 152*d* are radially arranged. A ratchet plate 154 is connected to the toothed cog portion 152*a* and has its own set of ratchet ridges 154*a* which engage with the ratchet ridges 152*d* of the toothed cog portion 152*a* so that the ratchet plate 154 rotates when the toothed cog portion 152*a* of the backrest arm 152 rotates. A wire guide 155 is attached to the side of the ratchet plate 154 remote from the toothed cog portion 152*a*, and a wire 156 extends from the ratchet plate 154, through the wire guide 155 and through a guide lug 151*b* on the left housing plate 151. The wire 156 is attached to the ratchet plate 154 such that when the left backrest arm 152 is pivoted from the operative position to the collapsed position, the wire 156 is pulled through the wire guide 155 and though the guide lug 151*b*, for reasons which will be explained in more detail below.

The right hinge bracket 160 is similar to the left hinge bracket 150 and comprises a backrest arm 162 and a wheel strut arm 163. The backrest arm 162 and the wheel strut arm 163 each include an integrally formed toothed cog portion 162*a*, 163*a*, and are rotatably secured to the housing plate 161 with the teeth of each cog portion 162*a*, 163*a* meshing. Therefore, when one arm is rotated, it causes the other arm to rotate. In use, the right side distal end 122*b* of the backrest frame member 122 is secured in an aperture in the backrest arm 162, and the one end 141*a* of the main wheel strut 141 is secured in an aperture in the wheel strut arm 163. The housing plate 161 includes an aperture 161*a* which, in use, receives the right distal end 121*b* of the base frame member 121. Any suitable means may be used to secure the backrest frame member 122 in the backrest arms 152, 162 and the diagonal bracing strut 142 and the main wheel strut 141 in the wheel strut arms 153, 163, such as screws, rivets or bolts. Similarly, the same suitable means can be used to secure the base frame member 121 to the apertures 151*a*, 161*a* in the left and right housing plates 151, 161 respectively.

The above arrangement allows the base and backrest frame members 121, 122 to be pivotable relative to one another about the hinge brackets 150, 160 from an operative position (see FIGS. 8-11), in which each frame member 121, 122 is spaced from the other, to a collapsed position and a storage position, in which the backrest frame member 122 is folded substantially flat and lies against the base frame member 121 (see FIGS. 12-19). In the operative position, the backrest arms 152, 162 and the wheel strut arms 153, 163 extend away from each other (see FIGS. 20A and 22A) and are at their maximum angular displacement from the base frame member 121, limited by end faces 152*b*, 162*b* of the backrest arms 152, 162 adjacent the toothed cog portions 152*a*, 162*a*, contacting end faces 153*b*, 163*b* of the wheel strut arms 153, 163 adjacent the toothed cog portions 153*a*, 163*a* (indicated at arrows 'A'). In the collapsed position and the storage position, the backrest arms 152, 162 and the wheel strut arms 153, 163 lie close to each other either side of their respective housing plate 151, 161 (see FIGS. 20B and 22E). The backrest arms 152, 162 and the wheel strut arms 152, 163 can be locked in the operative or storage position by a locking mechanism, described in detail below.

The right hinge bracket 160 includes a locking mechanism to lock the backrest arm 162 and the wheel strut arm 163 in a chosen position relative to each other. The locking mechanism comprises a locking plate 164 with a central post 164*a*, a spring 165 and a locking lever 166. The toothed cog portion 162*a* of the backrest arm has a central aperture 162*c*, around which ratchet ridges 162*d* are radially arranged. The locking plate 164 has a corresponding set of ratchet ridges (not shown) radially disposed around where the central post 164*a* joins the locking plate 164. The ratchet ridges 162*d* are located on the side of the toothed cog 162*a* that faces the ratchet ridges on the locking plate 164. The backrest arm 162 is rotatably attached to the housing plate 161 by the post 164*a* of the locking plate 164 passing though the spring 165, through the aperture 162*c* in the centre of the toothed cog portion 162*a*, through an aperture 161*b* in the housing plate 161 and is secured to the locking lever 166 by a pin 167 which extends though the locking lever 166 and through an aperture in the end of the post 164*a*.

Once assembled as described above, the locking lever 166 is pivotable about the pin 167. However, the distance $D_{unlocked}$ between the axis of the pin 167 and an upper angled face 166*b* of the locking lever 166 is less than a distance $D_{locked}$ between the axis of the pin 167 and a rear face 166*c* of the locking lever 166. Therefore, when the locking lever 166 is moved from a locked position (see FIGS. 22A and 22E) to an unlocked position (see FIGS. 22C and 22D), the locking lever 166 acts as a cam against the housing plate 161 and the pin 167 moves towards the housing plate 161 by a distance equal to $[D_{locked} - D_{unlocked}]$. This moves the post 164*a* and therefore the locking plate 164 away from the toothed cog portion 162*a* by a corresponding distance which is sufficient to ensure that the two sets of ratchet ridges are spaced from one another. The backrest arm 162 and the wheel strut arm 163 are therefore free to rotate relative to the housing plate 161. The spring 165 ensures that the locking plate 164 is held away from the toothed cog portion 162*a* when the locking lever 166 is in the unlocked position.

When the locking lever 166 is moved from the unlocked position to the locked position, the cam action moves the pin 167 by a distance equal to $[D_{locked} - D_{unlocked}]$ away from the housing plate 161. This pulls the central post 164*a* and the locking plate 164 towards the toothed cog portion 162*a* and the ratchet ridges 162*d* on the toothed cog portion 162*a* into engagement with the ratchet ridges on the locking plate 164. Neither the locking plate 164 not the locking lever 166 can rotate about the axis of the central post 164*a*. The locking plate 164 is shaped to abut a portion of the housing plate 161 and is thereby prevented from rotating relative to the housing plate 161. The wheel strut arm 163 is rotatably attached to the housing plate 161 by a shaft 168. The end of the shaft 168 proximate the locking lever 166 has a mushroom head 168*a* which projects from the end of the shaft 168 away from the wheel strut arm 163. The locking lever 166 includes a locking aperture 166*a* to receive the mushroom head 168*a* at the end of the shaft 168, and a latch mechanism within the locking lever 166 (not shown) engages with the rim of the mushroom head 168*a* to secure the locking lever 166 thereto. The locking lever also includes a release button 169 which disengages the latch mechanism from the mushroom head 168*a* to allow the locking lever to be pivoted about the pin 167 as described above. Therefore, when the locking lever 166 is secured to the mushroom head 168*a* at the end of the shaft 168 as described above, it is unable to rotate about the axis of the central post 164*a*. As a result, the backrest arm 162 and the wheel strut arm 163 are locked in position until the locking lever 166 is again moved to the unlocked position as described above, so that the ratchet ridges are moved out of engagement with each other. As the backrest frame member 122 connects the left backrest arm 152 to the right backrest arm 162, and the wheel struts 141, 142 connect the left wheel strut arm 153 to the tight wheel strut arm 163, the locking mechanism locks the movement of the both the wheel mechanism 140 and the backrest frame member 122 about the hinge brackets 150, 160.

The add-on seat 100 is provided with an attachment mechanism 170 to enable it to be secured to a conventional pushchair. The attachment mechanism 170 comprises front and rear pushchair clamps 171, 172, a connection bar 190, and front and rear hinges 191, 192. The pushchair clamps 171, 172 can be secured to a side frame of a pushchair and are releasably attachable to the connection bar 190. They are also designed to be able to be securely attached to pushchair frames of different cross-sections and dimensions, for example, they can attach to circular, oval, square and rectangular cross-section pushchair frames. The front and rear hinges 191, 192 are pivotally attached to the base frame member 121 and also to the connection bar 190. Therefore, when the two pushchair clamps 171, 172 are secured to the pushchair frame and to the connection bar 190, and the two hinges 191, 192 are secured to the base frame member 121 and to the connection bar 190, the add-on seat 100 is secured to the pushchair.

The connection bar 190 may also be provided with an articulated section 190*a* (see FIGS. 9 and 10) which is of the same cross-sectional dimension as the connection bar 190, but which is connected to one end thereof by an articulated joint 190*b* to be pivotable about a vertical axis of the joint 190*b* relative to the connection bat 190. This articulated section is designed to enable the add-on seat 100 to be connected to a pushchair whose side frame may not lie parallel with the forward direction of travel of the pushchair. For example, modern three-wheeled pushchairs have two rear wheels and the side frames taper inwards towards a single front wheel. To enable the add-on seat 100 to be attached to such a pushchair, the rear pushchair clamp 172 can be connected to the rear of the side frame of the pushchair and to the tear of the connection bar 190, and the front pushchair clamp 171 can be connected to the front of the pushchair and to the articulated section 190*a* of the connection bat 190, so that the front pushchair clamp 171 and articulated section 190*a* would be inset from the rear pushchair clamp 172 due to the shape of the pushchair. The articulated section 190*a* of the connection bat 190 would thus be pivoted towards the pushchair at an angle to the connection bar 190. The add-on seat 100 would still be secured to the pushchair, but the connection bar 190, and therefore the folding support frame 120 and wheel mechanism 140, would be in alignment with the direction of travel of the pushchair, and not angled inwards parallel to the tapered side of the pushchair. It will be appreciated that the articulated section 190*a* could equally be connected to the rearmost end of the connection bar 190 instead of the front end if necessary, for example, if the side of the pushchair to which is it so be attached, tapered inwardly towards the rear of the pushchair.

The two pushchair clamps 171, 172 are identical and so only one will be described in detail hereafter. The pushchair clamps 171, 172 comprise a first body 173 with a flexible metal band 174 ridgedly secured at one end 174*a* to one side of the first body 173, and the other free end 174*b* removably received in an aperture 173*a* in the opposite side of the first body 173. The aperture 173*a* houses a threaded screw 175 and the other free end 174*b* of the band 174 is received in the aperture 173*a* in contact with the threaded screw 175. The side of the band 174 adjacent the threaded screw 175 is provided with a series of parallel grooves 174*c* which cooperate with the thread of the threaded screw 175 such that when the threaded screw 175 is turned clockwise, the band 174 is pulled through the aperture 173*a*, reducing the size of the loop of band 174 between the rigidly secured one end 174*a* of the band 174 and the threaded screw 175. Conversely, when the threaded screw is turned anticlockwise, the other free end 174*b* of the band 174 is pushed through the aperture 173*a*, enlarging the size of the loop of band 174 between the rigidly secured one end 174*a* of the band 174 and the threaded screw 175, until the other end 174*b* of the band 174 is pushed free of the threaded screw 175. This function is similar to that of known 'jubilee clips'.

A second body 176 is secured to the first body 173 and can rotate relative to the first body 173 so that the second body 176 can be positioned in a specific orientation about a horizontal axis, regardless of at which angle the first body 173 is secured to a pushchair. The second body 176 includes a front opening to an internal cavity, and an upper and lower circular hole 176*a*, 176*b* in the upper and lower faces respectively leading to the internal cavity. A shaft 177 is disposed vertically within the internal cavity and includes side wings 177*a* which are received in corresponding slots 177*b* in the side walls of the internal cavity. A bolt 178 extends through a hole in the middle of the shaft 177 and through the rear wall of the second body portion 176, and is secured to the first body portion 173, providing the rotateable coupling described above. Upper and lower ends of the shaft 177 are provided with buttons 179*a*, 179*b* respectively, which are slidably received thereon and biased away from each other by upper and lower springs 180*a*, 180*b* respectively. When assembled, the upper and lower buttons 179*a*, 179*b* extend through the upper and lower holes 176*a*, 176*b* and are prevented from being pushed all of the way through their respective hole by a lip 181*a*, 181*b* at the base of each button which abuts the rim of the hole 176*a*, 176*b* on the inside of the internal cavity.

The pushchair clamps 171, 172 further include a third body 182 comprising a box section with a rectangular aperture 183 therethrough, and upper and lower arms 184*a*, 184*b* extending perpendicularly from the upper and lower faces of the box section. Each arm 184*a*, 184*b* has a circular aperture 185*a*, 185*b* therethrough sized slightly larger than the diameter of the buttons 179*a*, 179*b* of the second body 176. The third body 182 can be releasably secured to the second body 176 by depressing the buttons 179*a*, 179*b* towards each other so that they sit within the apertures 176*a*, 176*b*, and then sliding the third body 182 to engage with the second body 176 with the upper and lower arms 184*a*, 184*b* above and below the upper and lower surfaces of the second body 176. When the upper and lower circular holes 176*a*, 176*b* in the second body 176 are aligned with the upper and lower circular apertures 185*a*, 185*b* in the arms 184*a*, 184*b* respectively, the buttons 179*a*, 179*b* can spring outwards under the biasing force of the springs 180*a*, 180*b* through both upper and lower holes 176*a*, 176*b* and upper and lower apertures 185*a*, 185*b* to secure the second and third bodies 176, 182 together.

The front and rear hinges 191, 192 are similar to each other and will be described in detail hereafter. Both hinges 191, 192 comprise a first part 193 and a second part 194, pivotally connected to one another by a hinge rod 195 and pivotable relative to one another from an operative position in which the first and second part 193, 194 lie adjacent to each other, to a storage position in which the first and second parts 193, 194 extend away from each other.

The first part 193 has a rectangular aperture 193a therethrough of the same cross sectional dimension as that of the base frame member 121 to allow, in use, the base frame member 121 to make a press fit in the aperture 193a to be secured thereto. The second part 194 has a rectangular aperture 194a therethrough of the same cross sectional dimension as that of the connection bar 190 to allow, in use, the connection bar 190 to make a press fit in the aperture 194a to be secured thereto.

The first part 193 of the rear hinge 192 has a latch plate 198 which is received in a slot 196 in the bottom of the first part 193, and is spring biased out of the slot 196. The latch plate 198 is prevented from being pushed out of the slot 196 by a small retaining pin 198a which is located in a small vertical slot 193b in the side of the first part 193 of the hinge 192. The second part 194 has a flange 197 extending perpendicularly from the side of the second part 194 opposite the latch plate 198, and an upstanding lip 197a extends from the flange 197. As the hinge 192 is pivoted to the operative position, the lip 197a contacts the latch-plate 198 and pushes it upwards against the force of the spring bias, until the lip 197a passes the latch plate 198 and the latch plate 198 clicks into place between the lip 197a and the second part 194 of the hinge 192. The hinge 192 is thereby retained in the operative position until the latch plate 198 is lifted up and retracted into the slot 196 to release the lip 197a and allow the first and second parts 193, 194 to pivot freely. The latch plate 198 is attached to the wire 156 from the left hinge bracket 150 at a wire fastening point 198b on the top of the latch plate 198. The wire 156 extends from the wire fastening point, through the slot 196, out of the first part 193 of the rear hinge 192 and to the guide lug 151b, the wire guide 155 and ratchet plate 154 as described previously. Therefore, when the wire 156 is pulled by rotation of the ratchet plate 154 on rotation of the backrest arm 152, the latch plate 198 is pulled upwards in the direction of arrow 'B' into the slot.

The front hinge 191 does not have the latch plate 198 and lip 197a arrangement of the rear hinge 192. Instead, the front hinge only has a flange without an upstanding lip, and when the front hinge 191 is in the operative position, a lower face of the first part 193 sits on the flange 197 and is supported by it, but is not locked in that position. However, it is possible, in an alternative embodiment of the invention, for both front and rear hinges 191, 192 to include the latch 198 and lip 197a arrangement of the rear hinge 192.

The pushchair also includes a footrest 200, comprising a foot plate 201 and two support arms 202 pivotably attached to the base frame member 121. The footrest 200 can pivot from an operative position in which a seated child can rest their feet on the foot plate 201 (see FIGS. 8-11), to a folded position in which the footrest 200 is folded flat against the base frame member 121 (see FIGS. 12-19). The footrest 200 can be retained in the folded position by the wheel struts 153, 163 sandwiching it between them and the base frame member 121. The footrest also includes two wires or strings 203 extending from the footplate 201, or proximate the footplate 201, to the base frame member 121 to limit the maximum degree to which the footrest 200 can pivot away from the base frame member 121.

The add-on pushchair seat 100 of the invention is used as described hereafter. First, the two pushchair clamps 171, 172 are secured to the side frame of a pushchair. Once in place, the clamps 171, 172 are designed to remain secured to the pushchair at all times, even when the add-on seat 100 is not attached to the pushchair, and also when the pushchair itself is folded away for storage. The pushchair clamps 171, 172 are secured to the pushchair by unscrewing the threaded screw 175 so that the free end 174b of the steel band 174 is free of the first body 173. The steel band is then passed around an appropriate part of the pushchair frame and the free end 174b of the band 174 pushed into the aperture 173a so that the grooves 174c in the band 174 engage with the thread of the screw 175. The threaded screw 175 is then rotated clockwise to pull the band through the aperture 173a in the first body 173, which tightens the band 174 around the frame of the pushchair and grips the frame clamp 171, 172 thereto. An important feature of this system is that the pushchair clamps 171, 172 are attachable to pushchair frames of varying shapes and sizes, allowing the add-on seat 100 of the invention to be universally used with any commercially available pushchair. Although the add-on seat is adjustable to allow the pushchair clamps to be positioned at a range of heights on the side of the pushchair frame, it is important that each pushchair clamp 171, 172 is placed at the same height as the other.

Next, the second bodies 176 are rotated about their securing bolts 178 so that each one is positioned with the upper button 179a directly above the lower button 179b and the axis of the shaft 177 lying vertically. The two third bodies 182 are secured to the connection bar 190 and/or the articulated section 190a of the connection bar 190 if necessary, with the connection bar 190 and articulated section 190a making a press fit in the rectangular apertures 183. The third bodies 182 can be forced to slide along the connection bar 190 and articulated section 190a against the resistance of the press fit, so that they are horizontally spaced to align with the first and second bodies 173, 176 on the pushchair. The third bodies 182 are then attached to the second bodies 176 as described above, by depressing the upper and lower buttons 179a, 179b, sliding the upper and lower arms 184a, 184b above and below the upper and lower surfaces of the second bodies 176, and releasing the buttons 179a, 179b so that they spring though the upper and lower holes 176a, 176b in the second bodies 176, and also through the upper and lower apertures 185a, 185b in the arms 184a, 184b respectively. The third bodies 182 are thereby secured to the first and second bodies 173, 176, and so the connection bat 190 and articulated section is secured to the pushchair frame. As described above, the hinges 191, 192 are also secured to the connection bat 190 and to the base frame member 121, thereby connecting the whole add-on seat 100 to the pushchair.

The add-on seat 100 must be adjusted so that it is positioned correctly with respect to the pushchair. First the whole device is folded into the operative position as shown in FIGS. 8-11, with hinges 191, 192 in the operative position so the base frame member 121 is positioned in a horizontal plane, the backrest frame member 122 folded away from the base frame member 121, and the wheel mechanism 140 fully folded away from the base frame member 121. Next, the sliding wheel strut 144 is telescopically adjusted within the main wheel strut 141 until the wheel 145 contacts the ground. It will be appreciated that if the pushchair clamps 171, 172 are positioned either higher or lower on the pushchair frame, the sliding wheel strut 144 will need to be either extended out of, or retracted into the main wheel strut 141 for the wheel 145 to contact the ground. Once the sliding wheel strut 144 is in the correct position, it is secured in that position by the securing bolts 147a extending though the main strut 141 and through apertures 147b in the sliding strut 144. Finally, the add-on seat 100 is positioned so that the wheel 145 is aligned with the rear wheels of the pushchair to which it is attached. This can be done by sliding either the hinges 191, 192 along the connection bar 190 and/or articulated section 190a, or by sliding the third bodies 182 of the pushchair clamps 171, 172 along the connection bar 190. This allows the add-on seat 100 to be moved forwards or backwards with respect to the pushchair, until the correct position is obtained.

It is an important feature of the add-on seat 100 of the invention that it is constructed so that the tear wheel 145 and axle 146 can be positioned in line with and/or co-axial with the rear wheels of the pushchair. This enables the pushchair and attached add-on seat 100 to easily mount kerbs because a user can tilt the pushchair backwards towards themselves so that the pushchair and add-on seat 100 all pivot about a common axis—i.e. the line of contact on the ground of the pushchair wheels and the add-on seat 100 wheel 145. If the wheel 145 of the invention is not aligned with the rear wheels of the pushchair, the combined apparatus of the pushchair and add-on seat 100 would not tilt backwards (or forwards, to descend kerbs) easily.

It will be appreciated that if the height at which the add-on seat 100 is attached on the pushchair is changed, then the extension of the sliding wheel strut 144 within the main wheel strut 141, and the position of the base frame member 121 relative to the pushchair will have to be changed if the wheel 145 is to remain in line/co-axial with the rear wheels of the pushchair. More specifically, if the pushchair clamps 171, 172 are positioned higher up on the pushchair, the sliding wheel strut 144 will need to be extended out of the main wheel strut 141 further so that the wheel 145 contacts the ground, and consequently, the wheel 145 will be positioned further back relative to the pushchair. The base frame member 121 will then need to be moved forwards relative to the pushchair to re-align the wheel 145 with the wheels of the pushchair. Conversely, if the pushchair clamps 171, 172 are positioned lower down on the pushchair, the sliding wheel strut 144 will need to be retracted into the main wheel strut 141 for the wheel 145 to contact the ground, and consequently, the wheel 145 will be positioned further forwards relative to the pushchair. Therefore, the base frame member 121 will then need to be moved backwards relative to the pushchair to re-align the wheel 145 with the wheels of the pushchair.

Once in this operative position, the backrest frame member 122 is locked relative to the base frame 121 by the cam action of the locking lever 166 pulling the ratchet ridges of the locking mechanism into engagement as described above. The locking lever 166 is also held in the locked position by the internal latch engaging with the mushroom head 168a of the shaft 168 of the right hinge bracket 160, as described above. A child can then sit on the seat covering 123 with their back against the backrest covering 124 to be transported around on the add-on seat.

When the pushchair is to be used to carry only one child and the add-on seat 100 is not required, the add-on seat 100 can be folded from the operative position to a collapsed position (as shown in FIGS. 12-15) and then folded up to a storage position (as shown in FIGS. 16-19) as described hereafter.

The release button 169 is depressed (FIG. 22B), releasing the internal latch within the locking lever 166 which allows the locking lever 166 to pivot about the pin 167 (FIG. 22C) and free the mushroom head 168a of the shaft 168 from the locking aperture 166a. As described above, this cam action of the locking lever 166a allows the locking plate 164 to move away from the toothed cog portion 162a of the backrest arm 162 under the biasing force of the spring 165, and thereby disengage the ratchet ridges 162d on the toothed cog portion 162a from the ratchet ridges on the locking plate 164. This allows the two backrest arms 152, 162 and the two wheel strut arms 153, 163 to pivot about the hinge brackets 150, 160 respectively (FIG. 22D), and therefore allows the associated backrest frame member 122 and wheel mechanism 140 to pivot about the hinge brackets 150, 160.

The wheel mechanism 140 and the backrest frame member 122 can then be folded into the collapsed position in which they both lie flat against the base frame member 121 (see FIGS. 12-15). Once in this collapsed position, the locking lever 166 can be pivoted back to the locked position (FIG. 22E), pulling the locking plate 164 back towards the locking lever 166 and thereby engaging the ratchet ridges 162d on the toothed cog 162a with the ratchet ridges on the locking plate 164. This locks the backrest arms 152, 162 and associated backrest frame member 122, and the wheel strut arms 153, 163 and associated wheel mechanism 140, in the collapsed position. As mentioned previously, the footrest 200 is folded up with the wheel mechanism 140 in the collapsed position and is held between the main and bracing wheel struts 141, 142 and the base frame member 121.

Once in the collapsed position as described above, the add-on seat 100 can be folded up against the side of the pushchair into the storage position (see FIGS. 16-19). By moving the backrest frame member 122 to the folded collapsed position as described above, the wire 156 is pulled though the wire guide 155 and though the guide lug 151b, which pulls the latch plate 198 into the slot 196 in the rear hinge 192 to release the lip 197a, and thereby release the second part 194, of the rear hinge 192 from the first part 193. The collapsed folding support frame 120 and wheel mechanism 140 can then be pivoted upwards about the front and rear hinges 191, 192 to the storage position to lie flat against the side of the pushchair in a substantially vertical plane.

The add-on seat can be retained in the storage position described above by using a strap (not shown) to hold it to the pushchair. In addition, the wheel 145 can be removed from the axle as described above, and attached to a 'false axle' 146b protruding from the side of the connection bar 190 (see FIGS. 16 and 18). The side of the wheel 145 thereby abuts the hinges 191, 192 and prevents them from pivoting back to the operative position.

If the pushchair is to be transported, for example, in the boot of a car, it will most probably be necessary to remove the main body of the add-on seat 100 from the pushchair to allow the pushchair to be folded. This is done by detaching the third bodies 182 from the second bodies 176 of the pushchair clamps 171, 172 as described above. The only part of the add-one seat 100 that then remains attached to the pushchair is the first and second bodies 173, 176 of the pushchair clamps 171, 172 which are intended to be small enough to not hinder the folding mechanism of modern pushchairs.

Other unillustrated embodiments of the present invention may include additional features or accessories. For example, a rain cover could be provided, attachable to the auxiliary seat device 1/100, to partially or entirely surround a child seated on the device to shelter the child from wind/rain/sleet/snow. The rain cover could incorporate a supporting frame structure attachable to the device. Alternatively, the device could be provided with a sunshade or parasol.

The add-on seat 1/100 would preferably include a seat belt or a 3- or 5-point safety harness to secure around the child's waist and/or shoulders when seated, to prevent the child from falling off the seat and being injured.

The wheel struts 141, 142, 144 and folding frame members 121, 122 are intended to be made from light-weight steel tubing for optimum strength and rigidity, whilst also remaining light enough to carry easily. This also has the benefit of minimising the weight of the accessory exerted on the side of the pushchair so that when it is in the storage position, it does not cause the pushchair to tip over. It is also envisaged that the seat cover 123 and the backrest cover 124 are easily removable for cleaning, and replaceable when worn or to change the aesthetic appearance of the invention.

In addition to the functional accessories mentioned above, the auxiliary seat device 1 may also include an accessory intended to amuse the child whilst the child is in the seat. This could include a toy steering wheel or dashboard arrangement, or a hobby-horse style attachment positionable in front of the child.

The invention claimed is:

1. An auxiliary seat attachable to a pushchair having a fixed frame, to enable the pushchair to accommodate two children seated side-by-side, the auxiliary seat comprising a frame having a backrest and a base and a wheel in contact with the ground in an erect operative position to support a child seated on the base with their back against the backrest, wherein the frame of the auxiliary seat is configured so that the backrest and the base fold substantially flat when the auxiliary seat is not in use and wherein the auxiliary seat, including the base and backrest, can pivot relative to the pushchair to be folded against the side thereof in a collapsed storage position with the wheel off the ground, once the base and backrest of the auxiliary seat have been folded substantially flat, the auxiliary seat further comprising an attachment mechanism which connects the auxiliary seat to the pushchair and which is configured to allow the position of the frame of the auxiliary seat to be adjusted forwards and backwards relative to the fixed frame of the pushchair and to be independently adjusted forwards and backwards relative to the attachment mechanism.

2. An auxiliary seat according to claim 1 wherein the base and the backrest are pivotable relative to one another such that they are collapsible from the erect operative position to the collapsed storage position by means of a scissor-like mechanism.

3. An auxiliary seat according to claim 2 wherein the scissor-like mechanism includes at least one sliding joint to enable the base and backrest to be erected and collapsed.

4. An auxiliary seat according to claim 3 wherein the backrest is attached to one end of a first support strut and the base is attached to one end of a second support strut, and in which said first and second support struts are pivotable relative to each other and the end of the first support strut remote from the backrest is connected to the at least one sliding joint.

5. An auxiliary seat according to claim 3 comprising a locking mechanism to retain the auxiliary seat in the erect operative position and which locks the at least one sliding joint in place.

6. An auxiliary seat according to claim 5 wherein the locking mechanism comprises a latch extending from the at least one sliding joint, operable to lock onto a fixed shaft on the frame.

7. An auxiliary seat according to claim 6 wherein the latch is located at one end of an arm, the arm rotatably mounted to the at least one sliding joint and operable to move from a first locked position in which the latch snags on the fixed shaft, to a second unlocked position in which the latch is clear of the fixed shaft to allow movement of the at least one sliding joint.

8. An auxiliary seat according to claim 1 comprising a locking mechanism to retain the auxiliary seat in the erect operative position.

9. An auxiliary seat according to claim 1 wherein the backrest and the base are pivotably connected to one another by hinge joints to be pivotable from the erect operative position to the collapsed storage position in which the backrest lies flat against the base.

10. An auxiliary seat according to claim 9 wherein the base comprises a base frame and a seat covering attached thereto.

11. An auxiliary seat according to claim 9 wherein the backrest comprises a backrest frame with a backrest covering attached thereto.

12. An auxiliary seat according to claim 9 wherein the wheel is secured to the frame of the auxiliary seat by a pivotable wheel mechanism which can pivot from an extended operative position to a folded storage position in which the wheel mechanism lies substantially flat against the frame of the auxiliary seat.

13. An auxiliary seat according to claim 12 wherein the wheel mechanism includes a telescopic strut to allow the distance of the wheel from the frame of the auxiliary seat to be telescopically adjusted independently of the pivoting of the wheel mechanism between the operative position and the storage position.

14. An auxiliary seat according to claim 13 wherein the telescopic strut includes a locking mechanism to lock the strut in a desired position.

15. An auxiliary seat according to claim 12 wherein, in the storage position, the wheel mechanism lies flat against the base on the opposite side thereto to the backrest.

16. An auxiliary seat according to claim 12 wherein the wheel mechanism is connected to the frame of the auxiliary seat at said hinge joints.

17. An auxiliary seat according to claim 16 wherein the backrest and the wheel mechanism are mechanically connected to one another to be moveable together between their respective operative position and their folded storage position.

18. An auxiliary seat according to claim 16 wherein at least one hinge joint includes a locking means to lock the backrest in the operative position or in the storage position.

19. An auxiliary seat according to claim 17 wherein at least one hinge joint includes a locking means to lock the backrest and the mechanically associated wheel mechanism in the operative position or in the storage position.

20. An auxiliary seat according to claim 18 wherein the locking means includes a pair of ratchet plates operated by a cam lever to move from a locked position in which ratchets of each plate engage with each other, to an unlocked position in which the ratchets of each plate are out of engagement with each other to allow at least one of the backrest and wheel mechanism to pivot about the hinge joints.

21. An auxiliary seat according to claim 1 wherein the frame of the auxiliary seat is attached to the pushchair by a first clamping means extending from one side of the frame of the auxiliary seat.

22. An auxiliary seat according to claim 21 wherein the first clamping means is attached to a first support strut which is hingedly attached to the frame of the auxiliary seat.

23. An auxiliary seat according to claim 21 wherein the frame of the auxiliary seat is further attached to the pushchair by a second clamping means extending from said one side of the frame of the auxiliary seat.

24. An auxiliary seat according to claim 23 wherein the second clamping means is hingedly attached to the frame of the auxiliary seat.

25. An auxiliary seat according to claim 23 wherein the first and second clamping means are attachable to a supplementary pushchair frame bar which includes further attachment means operable to fix the bar and seat attached thereto, to a conventional pushchair.

26. An auxiliary seat according to claim 23 wherein the first and second clamping means are attachable to a replacement pushchair frame bar which can be fitted in place of an existing section of frame of a conventional pushchair to fix the auxiliary seat thereto.

27. An auxiliary seat according to claim 1 including at least one clamp to secure the auxiliary seat to a frame of a pushchair.

28. An auxiliary seat according to claim 27 wherein the at least one clamp is attached to a connection bar, and the frame of the auxiliary seat is attached to the connection bar by at least one hinge connector to be pivotable relative to the connection bar.

29. An auxiliary seat according to claim 28 wherein at least one of the at least one clamp and the at least one hinge connector are slidable relative to the connection bar to allow the position of the frame of the auxiliary seat to be adjusted relative to the pushchair.

30. An auxiliary seat according to claim 28 wherein the frame, the at least one hinge connector and the connection bar are releasably attached to the at least one clamp.

31. An auxiliary seat according to claim 28 wherein the at least one hinge connector includes a locking mechanism to lock the auxiliary seat in the operative position.

32. An auxiliary seat according to claim 1 wherein the wheel is detachable.

33. An auxiliary seat according to claim 1 including a locking mechanism to secure the auxiliary seat in the storage position.

34. An auxiliary seat according to claim 1 wherein the wheel is positioned such that when the auxiliary seat is mounted on the pushchair in an operative position, the wheel is in alignment with a rear wheel of the pushchair.

35. An auxiliary seat according to claim 1 wherein the wheel is positioned such that when the auxiliary seat is mounted on the pushchair in an operative position, an axle of the wheel is coaxial with an axle of a rear wheel of the pushchair.

36. An auxiliary seat according to claim 1 which is attachable to a pushchair to enable two children to be seated side-by-side and facing the same direction.

37. An auxiliary seat according to claim 1 wherein the auxiliary seat includes a safety harness to retain a child in position thereon.

38. An auxiliary seat according to claim 1 further including a rain cover attached to the auxiliary seat to at least partially surround a child sitting on the auxiliary seat.

39. An auxiliary seat according to claim 1 further including a sunshade attached to the auxiliary seat to shade a child sitting on the auxiliary seat.

40. An auxiliary seat according to claim 1 further including a toy steering wheel positionable in front of a child sitting on the auxiliary seat.

41. An auxiliary seat according to claim 1 further including a toy hobby-horse style attachment positionable in front of a child sitting on the auxiliary seat.

* * * * *